United States Patent [19]
Hattori et al.

[11] Patent Number: 5,685,183
[45] Date of Patent: Nov. 11, 1997

[54] VEHICLE LOCKING DEVICE

[75] Inventors: Masaichi Hattori; Osamu Shoji, both of Aichi, Japan

[73] Assignee: Kabushiki Kaisha Tokai Rika Denki Seisakusho, Aichi, Japan

[21] Appl. No.: 498,413

[22] Filed: Jul. 5, 1995

[30] Foreign Application Priority Data

Jul. 19, 1994 [JP] Japan ................... 6-166806

[51] Int. Cl.$^6$ .................................................. B60R 25/02
[52] U.S. Cl. .................................................. 70/252; 70/186
[58] Field of Search .......................... 70/252, 245, 247, 70/248, 182–186

[56] References Cited

U.S. PATENT DOCUMENTS

| | | | |
|---|---|---|---|
| 3,940,958 | 3/1976 | Kuroki | 70/186 |
| 4,414,830 | 11/1983 | Maicco | 70/252 |
| 4,773,241 | 9/1988 | Peitsmeier et al. | 70/252 |
| 5,230,233 | 7/1993 | Shoji et al. | 70/186 X |
| 5,271,252 | 12/1993 | Yasuhara et al. | 70/252 X |
| 5,315,851 | 5/1994 | Kuroki | 70/252 |
| 5,495,732 | 3/1996 | Nagae et al. | 70/252 |

FOREIGN PATENT DOCUMENTS

| | | | |
|---|---|---|---|
| 4037542 | 7/1991 | Germany | 70/252 |
| 1-146504 | 9/1989 | Japan . | |
| 4185553 | 7/1992 | Japan | 70/252 |

*Primary Examiner*—Suzanne Dino
*Attorney, Agent, or Firm*—Finnegan, Henderson, Farabow, Garrett & Dunner, L.L.P.

[57] ABSTRACT

A key interlocking mechanism for an automobile ensures that the automobile transmission is in the proper position when the key is removed. The mechanism includes a stopper pin protruding into the rotational path of the key motor and a solenoid valve energized when the automobile transmission is shifted out of park. When the key rotor is rotated with the solenoid valve unenergized, a cam plate within the mechanism acts to push the stopper pin up out of the rotational path of the key rotor. When the solenoid valve is energized, the stopper pin is prevented from being pushed out of the rotational path of the rotor. The key rotor is thus prevented from being rotated to a position in which the key can be removed from the rotor.

7 Claims, 15 Drawing Sheets

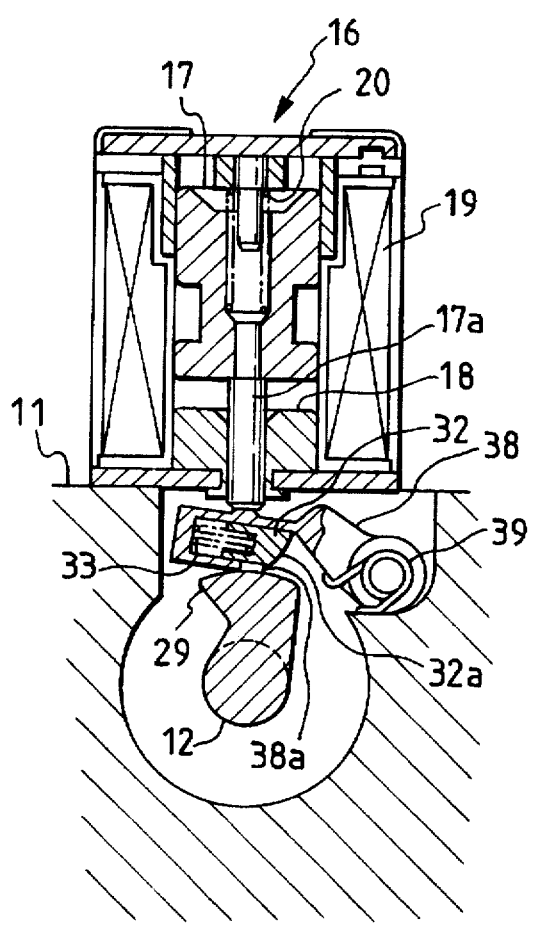 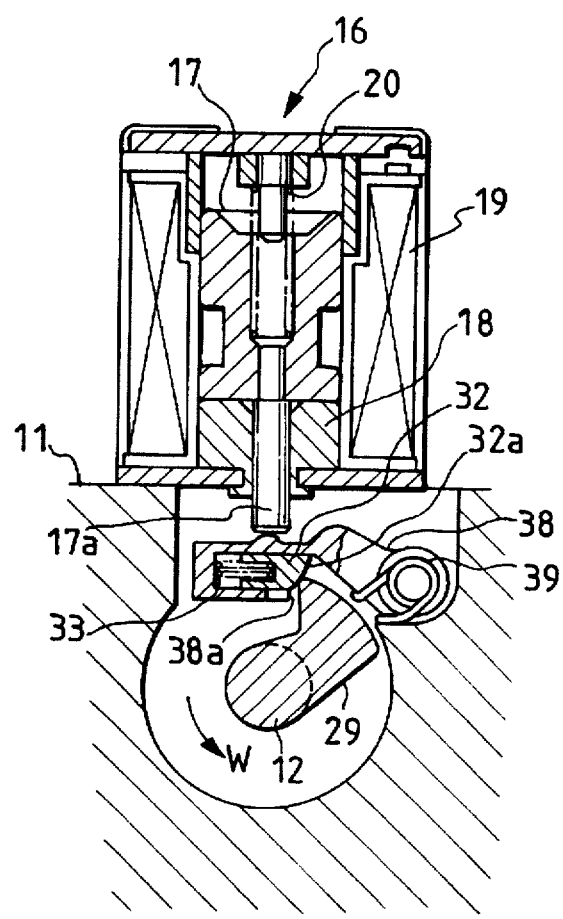

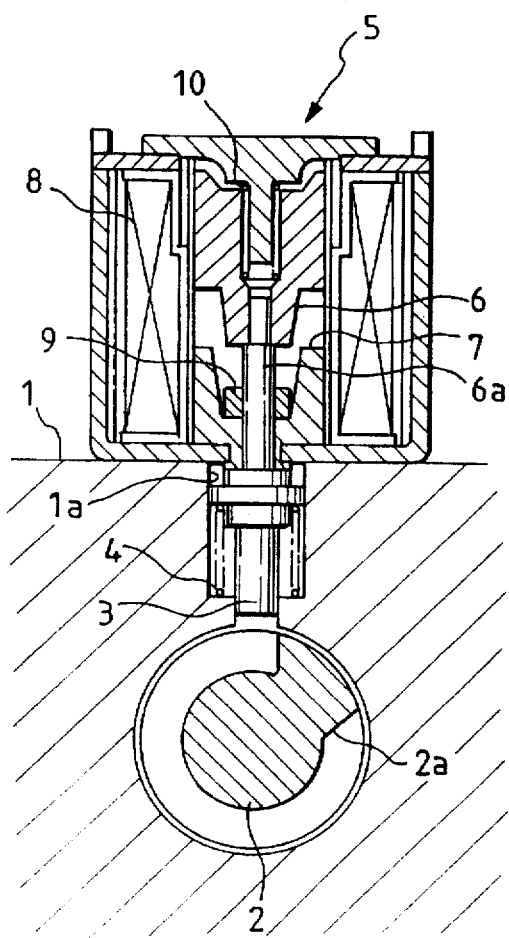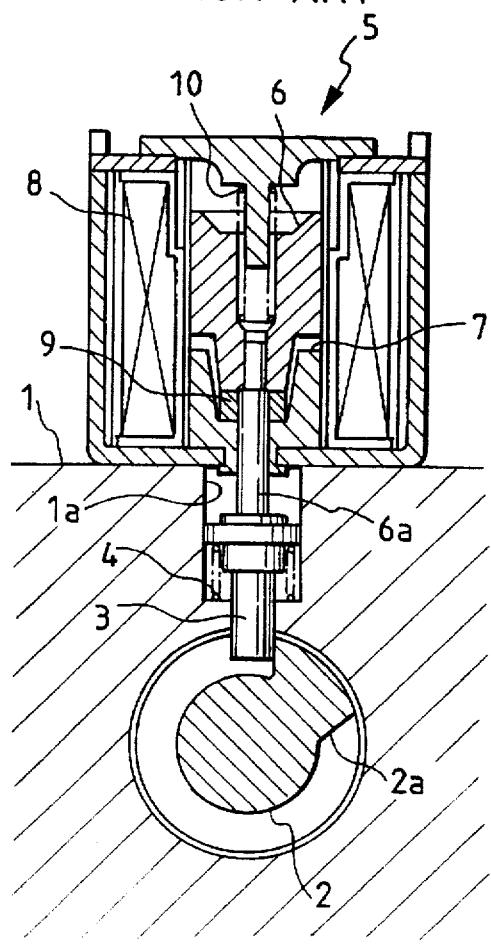

VEHICLE LOCKING DEVICE

BACKGROUND OF THE INVENTION

1. Field of the Invention

This invention relates to a vehicle locking device that can be used for an automobile key interlocking mechanism, etc.

2. Related Art

For example, a key interlocking mechanism is added to a shift locking device installed in an automobile to ensure that an automatic transmission is shifted to a parking position when an ignition key is pulled out. FIG. 30 shows a structural example of the main part of such a key interlock mechanism.

In FIG. 30, a shaft 2 pivotably supported in a body 1 is coupled coaxially with an ignition switch key rotor (not shown) and rotates in conjunction with the rotation of an ignition key to known operation positions (lock, accessory, on, and start positions). A stopper protrusion 2a is formed integrally with the shaft 2 on its outer peripheral surface.

A stopper pin 3 disposed in a stepped through hole 1a formed in the body 1 can reciprocate between an operational position protruding in the rotational path of the stopper protrusion 2a (position in FIG. 30(b)) and an operation release position retreating from the rotational path (position in FIG. 30(a)). When the stopper pin 3 is at the operational position, the stopper protrusion 2a abuts the stopper pin 3, thereby regulating rotational of the shaft 2, in turn and, rotation to the ignition key lock position. A return compression coil spring 4 is provided so as to energize the stopper pin 3 in a direction of the operation release position (upward).

An electromagnetic solenoid 5 fixed to the body 1 comprises a plunger 6 having a pin 6a abutting the stopper pin 3 from upward, a core 7, an excitation coil 8 for sucking the plunger 6 in a direction of the core 7 (downward), damper rubber 9, a compression coil spring 10 for energizing the plunger 6 in a direction of the stopper pin 3 (downward), etc. In this case, the spring force of the return compression coil spring 4 is set to a larger value than the sum total of the spring force of the compression coil spring 10 of the electromagnetic solenoid 5 and the weight of the coil spring 10, the plunger 6, and the stopper pin 3.

Therefore, in an operation stop state of the electromagnetic solenoid 5 (power-off state of the excitation coil 8), the state in FIG. 30(a) is maintained in which the stopper pin 3 and the plunger 6 are moved upward by the spring force of the return compression coil spring 4, whereby rotational to the ignition key lock position is allowed. When the excitation coil 8 is energized from the state and the electromagnetic solenoid 5 is operated, the plunger 6 is moved downward against the spring force of the return compression coil spring 4 and the plunger 6 and the stopper pin 3 are held in the state in FIG. 30(b); rotation to the ignition key lock position is regulated by the abutment between the stopper protrusion 2a and the stopper pin 3.

In the conventional structural, since the return compression coil spring 4 is provided, to move the stopper pin 3 from the operation release position in FIG. 30(a) to the operational position in FIG. 30(b), the electromagnetic solenoid 5 must perform a job against the spring force of the return compression coil spring 4 (in fact, force resulting from subtracting the spring force of the compression spring 10 and the weight of the plunger 6, etc., from the spring force of the return compression coil spring 4). Therefore, the generation force of the electromagnetic solenoid 5 needs to be made comparatively large, leading to a large scale of the electromagnetic solenoid 5. In this case, the solenoid value 5 can also be miniaturized with the generation force maintained. However, in the structural, heat generation becomes large as drive current increases, and it is feared that the life of the electromagnetic solenoid 5 may be adversely affected. Moreover, when the electromagnetic solenoid 5 operates or stops, collision sound between the plunger 6 and the damper rubber 9 or collision sound when the plunger 6 is returned by the return compression coil spring 4 is produced, causing noise to increase.

To prevent heat generation from adversely affecting the electromagnetic solenoid as described above, for example, as in Japanese Utility Model Laid-Open No. Hei 1-146504, a controller is provided for holding the operation state of the electromagnetic solenoid with the solenoid value drive voltage lowered after the electromagnetic solenoid is driven, whereby the heat output is suppressed. In this case, however, the controller having a complicated circuit configuration needs to be added, encountering a new problem of increasing the costs.

SUMMARY OF THE INVENTION

It is therefore an object of the invention to provide a vehicle locking device which produces the effects of miniaturizing an electromagnetic solenoid without increasing heat output or costs, suppressing noise, and exerting a locking function reliably.

To that end, according to the invention, there is provided a vehicle locking device for selectively inhibiting rotational of a rotor member rotated by an operation member to a specific position, the vehicle locking device comprising an arm member formed integrally with the rotor member, a stopper member being disposed so that it can reciprocate between an operational position entering a rotational path of the arm member and an operation release position retreating from the rotational path, means for energizing the stopper member in a direction of the operational position at the normal time, an electromagnetic solenoid for holding the stopper member at the operational position when the electromagnetic solenoid is energized, a rotation regulation part being formed in mutual abutments at the arm member and the stopper member for regulating rotation of the arm member in response to abutment, a cam member being disposed in the arm member or stopper member, whichever is formed with the rotation regulation part, so that the cam member can travel between a first position at which it abuts the arm member or stopper member before the rotation regulation part when the arm member is rotated in a direction of the stopper member and a second position retreating from the rotation regulation part, and spring means for energizing the cam member in a direction of the first position, the cam member being formed with a cam face for displacing the stopper member in a direction of the operation release position when the rotor member is rotated in a direction of the specific position with the cam member remaining held at the first position, the spring means being adapted to hold the cam member at the first position against an energizing force of the energizing means when the rotor member is rotated in the direction of the specific position with the electromagnetic solenoid powered off and to be deformed so as to move the cam member to the second position when the rotor member is rotated in the direction of the specific position with the electromagnetic solenoid energized.

In this case, the vehicle locking device can further include a stopper unit comprising the stopper member formed with the rotation regulation part and the cam member and spring means built in the stopper member as one piece, and a guide recess being adapted to allow the stopper member to reciprocate between the operational position and the operation release position by housing the stopper unit in a body for housing the arm member in a condition in which the stopper unit can linearly reciprocate.

The stopper member may have a tip face formed as the rotation regulation part and is formed like a bar containing a cam member housing hole opened in the tip face and a side face thereof, the cam member may be inserted into the cam member housing hole of the stopper member through the side face opening, so that it can travel between a first position protruding from the rotation regulation part through the tip face opening of the stopper member and a second position retreating from the rotation regulation part, and the spring means may be housed in the cam member housing hole for energizing the cam member in a direction of the first position.

The vehicle locking device may further include a detachment prevention part being formed integrally with the cam member and abutting a side face opening edge of a cam member housing hole for preventing the cam member from being detached in the direction of the first position.

According to the invention, there is provided a vehicle locking device for selectively inhibiting rotation of a rotor member rotated by an operation member to a specific position, the vehicle locking device comprising an arm member formed integrally with the rotor member, a stopper member being disposed pivotably with a support shaft as a supporting point for pivotally traveling between an operational position at which a tip of the stopper member is placed in a rotation path of the arm member and an operation release position at which it is retreated from the rotation path, means for energizing the stopper member in a direction of the operational position at the normal time, an electromagnetic solenoid for holding the stopper member at the operational position when the electromagnetic solenoid is energized, a rotation regulation part being formed in the tip of the stopper member and abutting the arm member in a condition in which the stopper member is at the operational position for regulating rotation of the arm member, a cam member being disposed pivotably with the support shaft as a supporting point for pivotally traveling between a first position at which it abuts the arm member before the rotation regulation part when the arm member is rotated in a direction of the stopper member and a second position retreating from the rotation regulation part, and spring means for energizing the cam member in a direction of the first position, wherein the abutment of the cam member against the stopper member is formed with a cam face for displacing the stopper member in a direction of the operation release position when the rotor member is rotated in a direction of the specific position with the cam member remaining held at the first position, the spring means being adapted to hold the cam member at the first position against an energizing force of the energizing means when the rotor member is rotated in the direction of the specific position with the electromagnetic solenoid powered off and to be deformed so as to move the cam member to the second position when the rotor member is rotated in the direction of the specific position with the electromagnetic solenoid energized.

The spring means may be made of a compression coil spring placed between the stopper member and the cam member.

To easily understand the description of the vehicle locking device of the present invention, an example in which the arm member is formed with the rotation regulation part and the cam member will be discussed.

The energizing means normally energizes the stopper member in the direction of the operational position entering the rotational path of the arm member. When the rotor member is rotated in the direction of the specific position in such a state, the arm member formed integrally with the rotor member is rotated and the cam face of the cam member located in the arm member abuts the stopper member, so that a force responsive to the energizing force of the energizing means is applied to the cam member.

At the time, if the electromagnetic solenoid is powered off, the spring means holds the cam member at the first position against the energizing force of the energizing means. When the rotor member is rotated in the direction of the specific position with the cam member remaining held in the first position, the cam face displaces the stopper member in the direction of the operation release position retreating from the rotation path of the arm member. Therefore, the rotor member is rotated to the specific position.

In contrast, if the electromagnetic solenoid is energized, the spring means is deformed so as to move the cam member to the second position by the force acting on the cam member. When the cam member has been moved to the second position, it retreats from the rotation regulation part formed in the arm member, thus the rotation regulation part abuts the stopper member for regulating rotation of the arm member, thereby inhibiting rotation of the rotor member to the specific member.

In this case, the electromagnetic solenoid needs only to generate a comparatively small force for holding the stopper member at the operational position and can be miniaturized. It needs not cause a large drive current to flow and heat output can be suppressed. As a result, a conventional controller having a complicated circuit configuration need not be provided additionally; thus the costs need not be increased. Moreover, the stopper member is moved to the operational position by the energizing means and to the operation release position by an external operation force acting on the cam face through the rotor member, so that noise generated as the stopper member is moved can be lessened. Further, when the electromagnetic solenoid is energized, the function of the cam face is made ineffective and rotation of the arm member is regulated reliably by the rotation regulation part, thus the lock function can be exerted securely.

The vehicle locking device of the present invention can also produce similar effect to that described above except that the stopper member linearly travels between the operational position and operation release position. In this case, the rotation regulation part is formed in the stopper member, which is integrated with the cam member and the spring means to make up the stopper unit. Thus, they can be handled as one part and assembly workability can be improved. In the manufacturing process, the stopper unit needs only to be housed in the guide recess, so that assembly workability can be further improved.

The vehicle locking device of the present invention can also produce similar effect to that as described above. In this case, to attach the cam member to the stopper member, after the cam member is inserted into the cam member housing hole made in the stopper member through the side face opening of the cam member housing hole, the spring means needs only to be housed in the cam member housing hole, improving assembly workability.

When the cam member is inserted into the cam member housing hole as described above, it is energized in the direction of the first position protruding through the tip face opening of the stopper member by the spring means. Since the vehicle locking device of the present invention has a detachment prevention part integral with the cam member for preventing the cam member from being detached in the direction of the first position, once the cam member is inserted into the cam member housing hole, it becomes difficult for the cam member and the spring means to fall out. Therefore, the stopper member, the cam member, and the spring means can be handled as one part, also improving assembly workability.

At the vehicle locking device of the present invention the stopper means pivotable with the support shaft as the supporting point is energized by the energizing means in the direction of the operational position at the normal time and the cam member pivotable with the support shaft as the supporting point is also energized by the energizing means in the direction of the first position. In such a state, when the arm member formed integrally with the rotor member is rotated as the rotor member is rotated in the direction of the specific position, it abuts the cam member at the first position before the stopper member, so that a force responsive to the energizing force of the energizing means is applied to the cam member.

At that time, if the electromagnetic solenoid is powered off, the spring means holds the cam member at the first position against the energizing force of the energizing means. When the rotor member is rotated in the direction of the specific position with the cam member remaining held in the first position, the cam face formed on the cam member displaces the tip of the stopper member in the direction of the operation release position retreating from the rotation path of the arm member. Therefore, the rotor member is rotated to the specific position.

In contrast, if the electromagnetic solenoid is energized, the spring means is deformed so as to rotate the cam member to the second position by the force acting on the cam member from the arm member. When the cam member has been rotated to the second position, it retreats from the rotation regulation part formed in the tip of the stopper member, thus the arm member abuts the rotation regulation part for regulating rotation of the arm member, thereby inhibiting rotation of the rotor member to the specific member.

In this case, the vehicle locking device also produces similar effects to those described above, such that the electromagnetic solenoid needs only to generate a comparatively small force for holding the stopper member at the operational position and can be miniaturized. Particularly in this case, the cam member provided with the cam face is of rotation form, so that the force received from the arm member can be efficiently converted into a rotation force of the cam member. Even if the friction coefficient between the arm member and the cam face changes, a load acting on the spring means with the electromagnetic solenoid energized is made constant, thus the holding power required for the electromagnetic solenoid may be set to a necessary minimum value.

With the vehicle locking device of the present invention, since the force acting on the cam member from the arm member is normally transmitted via the compression coil spring to the stopper member, it is difficult for the arm member abut the stopper member when the rotor member is rapidly rotated in the direction of the specific position with the electromagnetic solenoid powered off, thus rotation of the rotary member being inadvertently inhibited can be prevented from occurring.

BRIEF DESCRIPTION OF THE DRAWINGS

In the accompanying drawings:

FIGS. 20(a) and (b) are longitudinal sectional views showing an eighth embodiment of the invention;

FIGS. 30(a) and (b) are longitudinal sectional views showing a conventional example.

DETAILED DESCRIPTION OF THE PREFERRED EMBODIMENTS

Referring now to the accompanying drawings, there are shown preferred embodiments of the invention.

First Embodiment

A first embodiment of the invention will be discussed with reference to FIGS. 1 to 5.

Figure 1A:
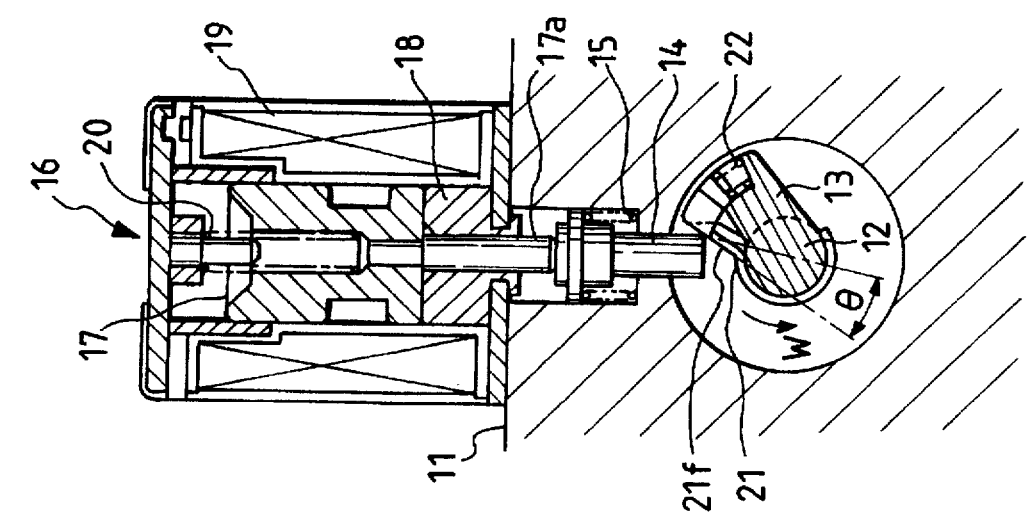
FIGS. 1(a) to (c) are longitudinal sectional views showing a first embodiment of the invention.

In FIG. 1, a shaft 12 pivotably supported in a body 11, which is made, for example, by zinc die casting, is coupled coaxially with an ignition switch key rotor (not shown), is also called a rotor member, and rotates in conjunction with rotation of an ignition key, of to an operation member, to known operation positions (lock, accessory, on, and start positions). A stopper protrusion 13, of an arm member, is formed integrally with the shaft 12 on its outer peripheral surface, and is at rotation positions shown in FIG. 1(a) and (c) when the ignition key is at the lock position and accessory position. The lock position is equivalent to a specific position of the rotor member.

The body 11 is formed with a stepped through hole 11a at a position corresponding to the axial center of the shaft 12, and a stopper pin 14, or a stopper member, is disposed in the stepped through hole 11a so that it can reciprocate vertically. In this case, the stopper pin 14 reciprocates between an operational position protruding in the rotational path of the stopper protrusion 13 (position in FIG. 1(b), (c)) and an operation release position retreating from the rotational path (position in FIG. 1(a)). A compression coil spring 15 for upwardly energizing the stopper pin 14 is placed between the flange part of the upper part of the stopper pin 14 and the step part of the through hole 11a. The tip face of the stopper protrusion 13, namely, the face that the lower end of the stopper pin 14 abuts when the ignition key is at the lock position shown in FIG. 1(a) is formed like a circular arc face along the rotational path of the stopper protrusion 13.

An electromagnetic solenoid 16 fixed to the body 11 comprises a plunger 17 having a pin 17a abutting the stopper pin 14 from upward, a core 18 to which the plunger 17 is attracted, an excitation coil 19 for sucking the plunger 17 in a direction of the core 18 (downward), a compression coil spring 20, or energizing means, for energizing the plunger 17 in a direction of the stopper pin 14 (downward), etc.

In this case, the spring force of the compression coil spring 20 is set to a value so that a downward force resulting from adding the weight of the plunger 17, the compression coil spring 20, and the stopper pin 14 to the spring force becomes larger than an upward force produced by the spring force of the compression coil spring 15. Therefore, the stopper pin 14 is energized in the downward operational position (FIG. 1(b), (c)) direction by the spring force of the compression coil spring 20 at the normal time.

At the electromagnetic solenoid 16, the top of the core 18 and the bottom of the plunger 17, namely, the attraction faces of the core 18 and the plunger 17 are formed like a flat and both the core 18 and the plunger 17 cohere to each other, whereby a force required for holding both the core 18 and the plunger 17 in an attraction condition can be produced by comparatively small power consumption.

When automatic transmission of the automobile is at a position other than the parking position, the electromagnetic solenoid 16 is energized; when it is shifted to the parking position, the electromagnetic solenoid 16 is powered off.

Figure 1B:
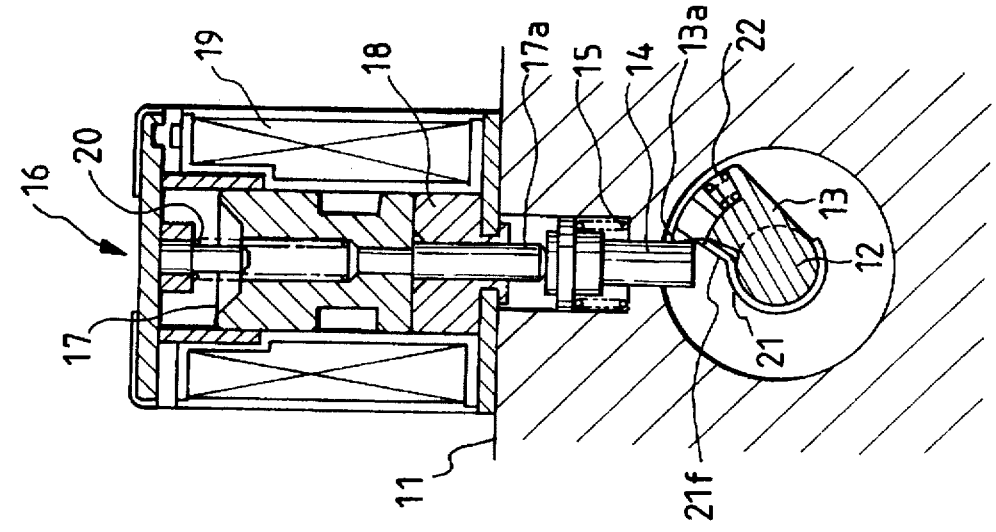
Figure 3:
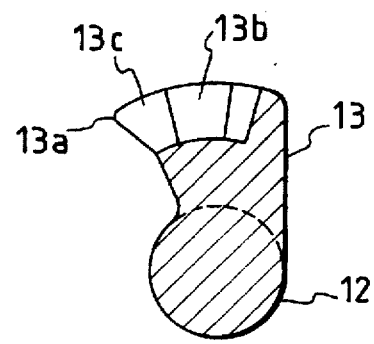
FIG. 3 is a longitudinal sectional view of a stopper protrusion of the first embodiment of the invention.
Figure 4:
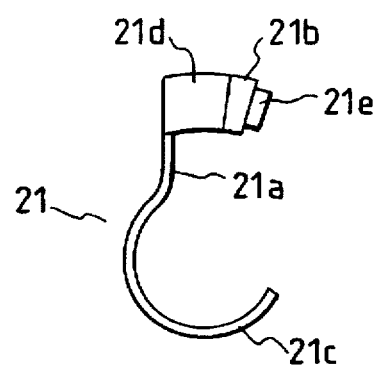
FIG. 4 is a side view of a cam plate of the first embodiment of the invention.
Figure 5:
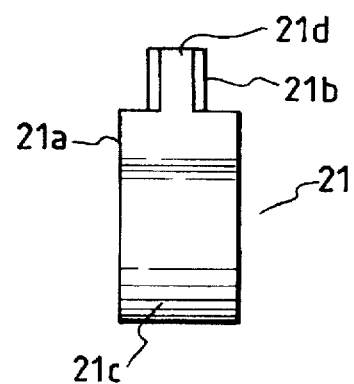
FIG. 5 is a front view of the cam plate of the first embodiment of the invention.

The stopper protrusion 13 is formed so as to abut the stopper pin 14 at a tip, which functions as a a rotation regulation part 13a called in the invention (see FIGS. 1(b) and 3). This means that the rotation regulation part 13a is formed so as to regulate rotation of the stopper protrusion 13 by abutting the stopper pin 14 at the operational position from the side.

The stopper protrusion 13 is formed with a cam plate 21 as a cam member. As shown also in FIGS. 4 and 5, the cam plate 21 has a detachment prevention piece 21b and an annular holding part 21c integrally formed on the top and bottom of a main body 21a like a flat plate, and is attached so as to pivotably travel in the rotation direction of the stopper protrusion 13 by fitting the annular holding part 21c around the shaft 12. The detachment prevention piece 21b is coupled with a tip (free end) of the cam plate 21a via a narrow guide part 21d and has a protrusion 21e functioning as a reception washer of a compression coil spring 22 (described below) on the face opposite to the guide part 21d.

Figure 1C:
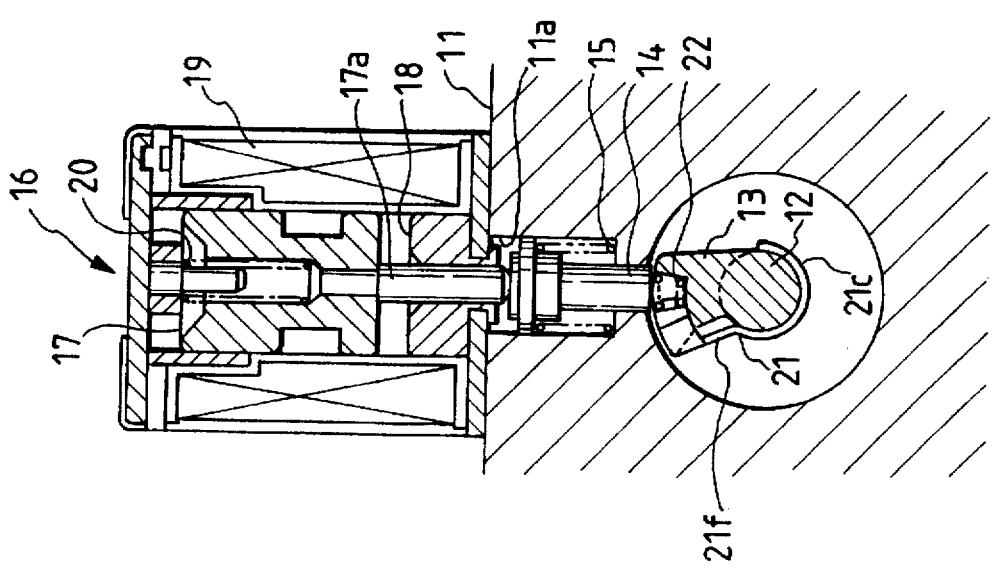
Figure 2:
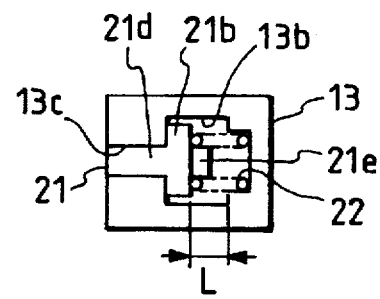
FIG. 2 is a plan view of the main part of the first embodiment of the invention.

As shown in FIGS. 2 and 3, the stopper protrusion 13 is formed with a recess 13b for housing the detachment prevention piece 21b of the cam plate 21 and a groove 13c for housing the guide part 21d of the cam plate 21. The cam plate 21 can rotate by stroke L (see FIG. 2 showing a state in which the stopper protrusion 13 is viewed from top) for allowing the detachment prevention piece 21b to move within the recess 13b. Specifically, the cam plate 21 can travel pivotally between a first position (FIG. 1(c)) at which the cam spring 21 abuts the stopper pin 14 before the rotation regulation part 13a when the stopper protrusion 13 is rotated in the direction of the stopper pin 14, and a second position (FIG. 1(b)) retreating from the rotation regulation part 13a.

In this case, when the cam plate 21 is at the first position, it is positioned so that the front face of the main body 21 (abutment face with the stopper pin 14) becomes tilted shallower by angle θ (see FIG. 1(c)) than the face perpendicular to the rotation direction of the stopper protrusion 13, whereby the front face of the main body 21 functions as a cam face 21f. As a result, assuming that the cam plate 21 is held at the first position, if a shaft 12 is rotated in the arrow W direction in FIG. 1(c) as an ignition key is turned in the lock position direction from the accessory position when the electromagnetic solenoid 16 is powered off, the stopper pin 14 is pushed up by the cam face 21f. If turning the ignition key as described above is continued, the stopper pin 14 is displaced in the operation release position direction against the weight of the compression coil spring 20 and the plunger 17, etc.

The compression coil spring 22, or spring means, intervening between the cam plate 21 and the deep wall of the recess 13b is housed in the recess 13b of the stopper protrusion 13. The cam plate 21 is normally energized in a direction of the first position by the compression coil spring 22.

In this case, the spring force of the compression coil spring 22 is set to a value larger than a stress acting on the cam plate 21 from the stopper pin 14 when the shaft 12 is rotated in the arrow W direction in a condition in which the electromagnetic solenoid 16 is powered off (corresponding to a force resulting from subtracting an upward force produced by the compression coil spring 15 from a downward force responsive to the spring force of the compression coil spring 20 in the electromagnetic solenoid 16 and the weight of the plunger 17, etc.,) and smaller than a force acting on the cam plate 21 when the shaft 12 is rotated in the arrow W direction in a condition in which the electromagnetic solenoid 16 is energized (corresponding to a force resulting from adding the attraction force of the electromagnetic solenoid 16 to the downward force from the stopper pin 14).

Therefore, when the shaft 12 is rotated in the arrow W direction with the electromagnetic solenoid 16 powered off, the cam plate 21 remains held in the first position and the stopper pin 14 is pushed up by the cam face 21f. When the shaft 12 is rotated in the arrow W direction with the electromagnetic solenoid 16 energized, the compression coil spring 22 is compressed, moving the cam plate 21 to the second position, thereby making the function of the cam face 21f ineffective.

Next, the operation of the embodiment having the structural will be discussed.

At the normal time, the stopper pin 14 is energized in a direction entering the rotation path of the stopper protrusion 13, namely, the operational position direction due to the spring force of the compression coil spring 20, the weight of the plunger 17, etc. In this case, when the ignition key is at the lock position, the stopper pin 14 has the lower end abutted against the tip face of the stopper protrusion 13 and is held to the operation release position, as shown in FIG. 1(a). When the ignition key is, for example, at the accessory position, the stopper pin 14 is moved to the operational position entering the rotation path of the stopper protrusion 13, as shown in FIG. 1(c).

When the ignition key is at the accessory position, if it is turned in the lock position direction, the shaft 12 is rotated in the arrow W direction, causing the cam face 21f of the cam plate 21 disposed in the stopper protrusion 13 to abut the stopper pin 14. Thus, stress is applied from the stopper pin 14 to the cam plate 21.

If the automatic transmission of the automobile is shifted to the parking position, the electromagnetic solenoid 16 is powered off, thus the spring force of the compression coil spring 22 is larger than the stress applied from the stopper pin 14 to the cam plate 21 and therefore the cam plate 21 remains held to the first position. When the ignition key is turned in the lock position direction with the cam plate 21 remaining at the first position, the cam face 21f pushes up the stopper pin 14 in the operation release position direction against the spring force of the compression coil spring 20, the weight of the plunger 17, etc. Finally, as shown in FIG. 1(a), the stopper pin 14 is displaced to the operation release position and the ignition key is turned to the lock position.

In contrast, when the ignition key is turned in the lock position direction from the accessory position, if the automatic transmission of the automobile is shifted to any position other than the parking position, the electromagnetic solenoid 16 is energized, thus the compression coil spring 22 is compressed so as to move the cam plate 21 to the second position by the stress acting on the cam plate 21 at the time. The cam plate 21, which is thus moved to the second position, retreats from the rotation regulation part 13a formed in the stopper protrusion 13 as shown in FIG. 1(b), making the function of the cam face 21 ineffective. Also, the rotation regulation part 13a abuts the stopper pin 14 for regulating the rotation of the stopper protrusion 13.

Therefore, in this state, even if an attempt is made to turn the ignition key from the accessory position to the lock position, the rotation of the stopper protrusion 13 is reliably regulated, inhibiting rotation of the ignition key (in turn, the key rotor) to the lock position.

In this case, the electromagnetic solenoid 16 needs only to generate a comparatively small force for holding the stopper pin 14 to the operational position and can be miniaturized. It does not need a large drive current and heat output can be suppressed. As a result of thus suppressing the heat output of the electromagnetic solenoid 16, a conventional controller having a complicated circuit configuration need not be provided additionally and costs need not be increased. Particularly, the electromagnetic solenoid 15 adopts the structural in which the attraction faces between the core 18 and the plunger 17 are formed like a plane and brought into intimate contact with each other, whereby power consumption required to produce a force for holding them in an attraction state extremely lessens. Therefore, it has a merit of producing the above-mentioned miniaturization and heat output suppression effects.

Figure 18A:
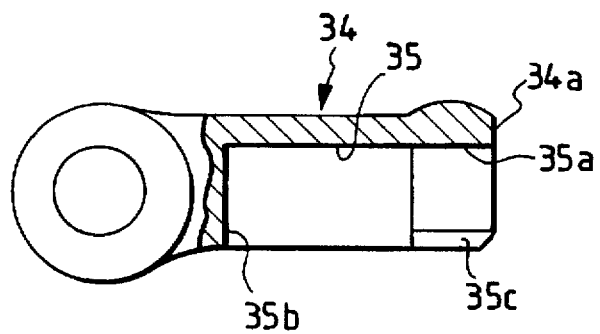
FIGS. 18(a) to (c) are a partially broken-away side view, front view, and bottom view of a swing lever of the seventh embodiment of the invention, respectively.
Figure 18B:
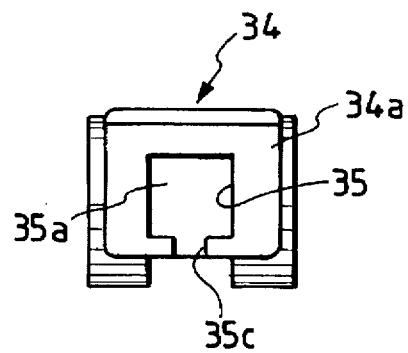

In the conventional example shown in FIG. 30, as the electromagnetic solenoid 5 is powered on and off, the plunger 6 (and the pin 6a attached thereto) and the stopper pin 3 travel between the operation release position and the operational position (FIG. 18(b)). Therefore, at the instant at which the electromagnetic solenoid 5 is powered on or off, production of operation noise is inevitable.

In contrast, in the embodiment shown in FIG. 1, the plunger 17 (and the pin 17a attached thereto) and the stopper pin 14 are always energized to the position in FIG. 1(c) by the compression coil spring 20, and do not move as the electromagnetic solenoid is powered on or off. Therefore, operation noise caused by powering on or off the electromagnetic solenoid is not produced.

According to the structural of the first embodiment, when the electromagnetic solenoid 16 is energized, the function of the cam face 21 is made ineffective and rotation of the stopper protrusion 13 is regulated reliably by the rotation regulation part 13a, thus the lock function can be exerted securely.

Second Embodiment

Figure 6:
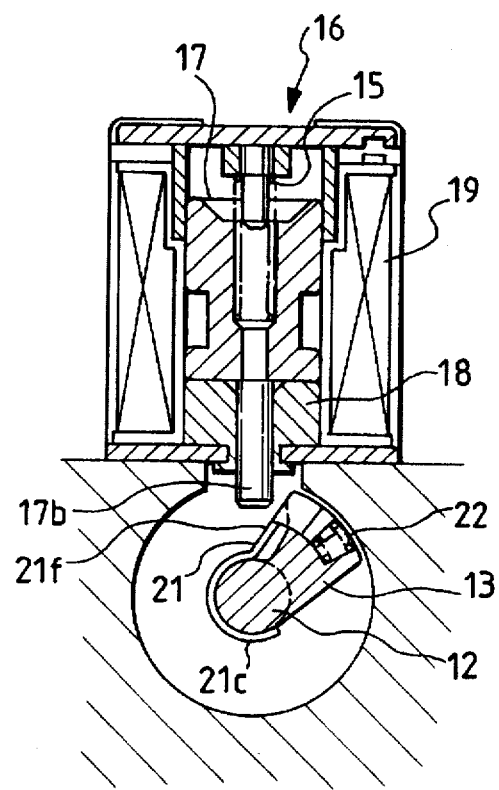
FIG. 6 is a longitudinal sectional view showing a second embodiment of the invention.

FIG. 6 shows a second embodiment of the invention. Only the differences between the first and second embodiments will be discussed.

The second embodiment is characterized by the fact that a pin 17b of a plunger 17 of an electromagnetic solenoid 16 is substituted for the function of the stopper pin 14 in the first embodiment. Therefore, the pin 17b is equivalent to a stopper member called in the invention.

The second embodiment adopting the structural eliminates the need for the stopper pin 14 and the compression coil spring 20 in the first embodiment, so that the number of parts can be reduced and thus costs can be lowered.

Third Embodiment

Figure 7:
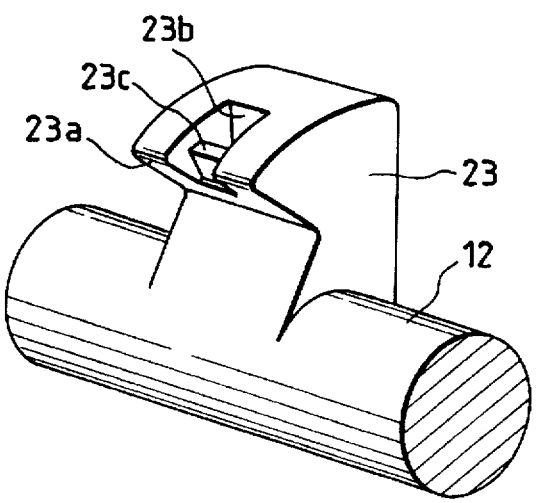
FIG. 7 is a perspective view of a stopper protrusion showing a third embodiment of the invention.

FIGS. 7 and 8 show a third embodiment of the invention. Only the differences between the first and third embodiments will be discussed.

In the third embodiment, a stopper protrusion 23 is provided on the outer peripheral surface of a shaft 12 as an arm member in place of the stopper protrusion 13 in the first embodiment, and the tip of the stopper protrusion 23 functions as a rotation regulation part 23a and is formed with a recess 23b into which the tip of a plate spring 24 is inserted. A rib 23c for preventing the tip of the plate spring 24 from being detached is formed in the recess 23b.

The plate spring 24 functions as both spring means and a cam member called in the invention, and is fixed, for example, by a rivet 24b in a condition in which a ring-like holding part 24a bent and formed on the base end is engaged around the shaft 12. A guide piece 24c bent and formed on the tip is positioned in the recess 23b of the stopper protrusion 23. In this case, the tip of the guide piece 24c is bent downward and is locked in the rib 23c as shown in FIG. 8(a), thereby preventing the tip of the plate spring 24 from being detached from within the recess 23b.

Figure 8A:
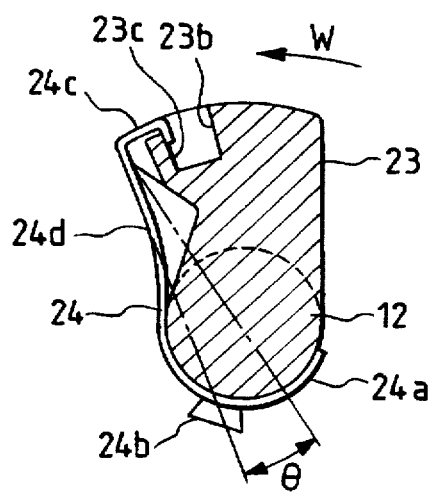
FIGS. 8(a) and (b) are longitudinal sectional views of the main part of the third embodiment of the invention.
Figure 8B:
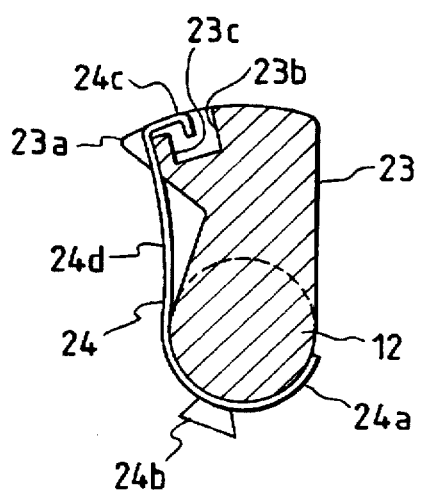

The structural enables the plate spring 24 to pivotally travel between a first position (FIG. 8(a)) at which the plate spring 24 abuts a stopper pin 14 before the rotation regulation part 23a when the stopper protrusion 23 is rotated in a direction of the stopper pin 14 and a second position (FIG. 8(b)) retreating from the rotation regulation part 23a; it is energized in a direction of the first position by its own spring force at the normal time.

When the plate spring 24 is at the first position, it is positioned so that its front face (abutment face with the stopper pin 14) becomes tilted shallower by angle θ (see FIG. 8(a)) than the face perpendicular to the rotation direction of the stopper protrusion 23, whereby the front face functions as a cam face 24d. Further, the spring force of the plate spring 24 is set to a value larger than a force acting on the cam face 24d from the stopper pin 14 when the shaft 12 is rotated in the arrow W direction in FIG. 8 in a condition in which the electromagnetic solenoid 16 is powered off and smaller than a force acting on the cam face 24d when the shaft 12 is rotated in the arrow W direction in FIG. 8 in a condition in which the electromagnetic solenoid 16 is energized.

Therefore, the third embodiment having the structural also produces a similar effect to that of the first embodiment. Particularly, in the third embodiment, the plate spring 24 can provide both spring means and cam member functions and the form of the plate spring 24 can be simplified, so that the entire structural can be simplified.

Fourth Embodiment

FIGS. 9 to 12 show a fourth embodiment of the invention. Only the differences between the first and fourth embodiments will be discussed.

Figure 9A:
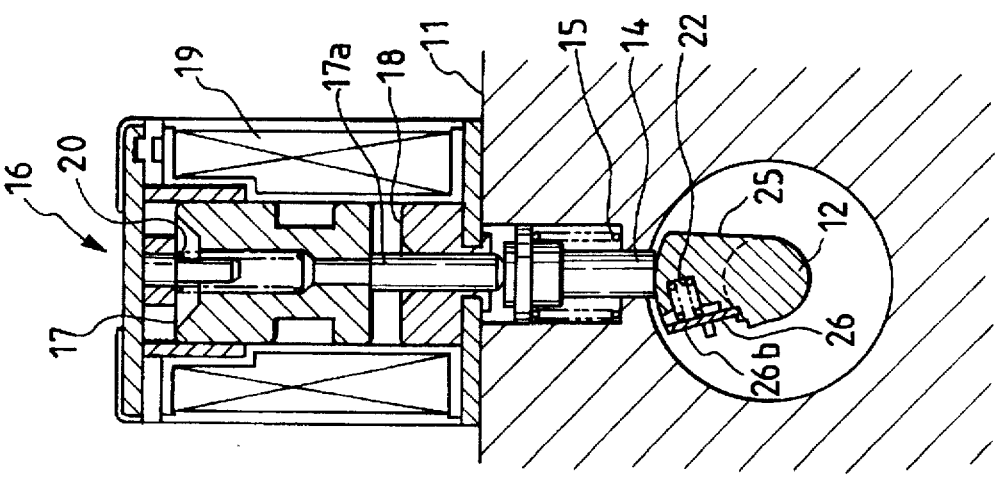
FIGS. 9(a) to (c) are longitudinal sectional views showing a fourth embodiment of the invention.
Figure 9B:
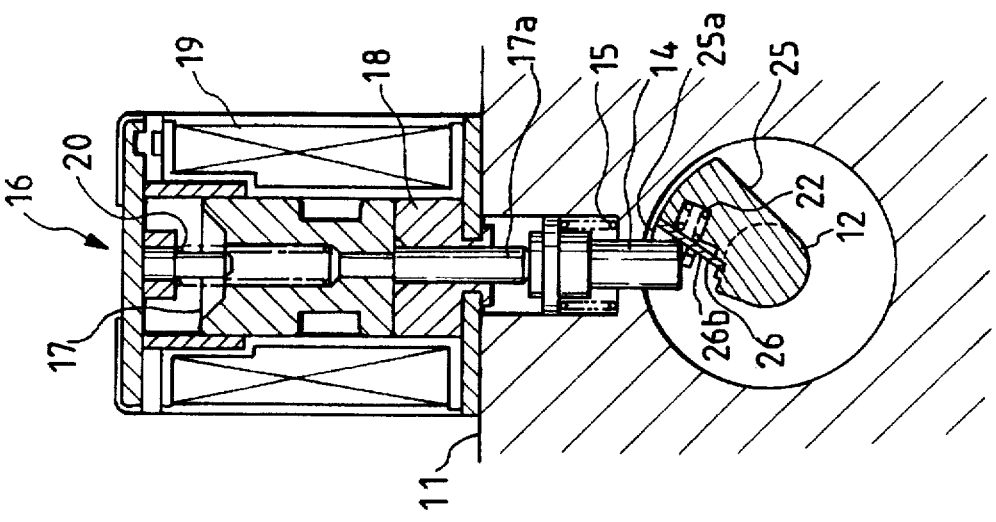
Figure 10:
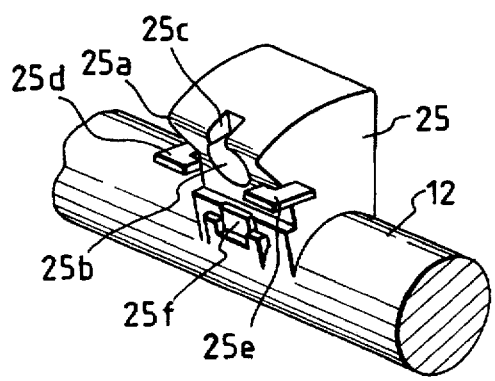
FIG. 10 is a perspective view of the main part of the fourth embodiment of the invention.
Figure 11:
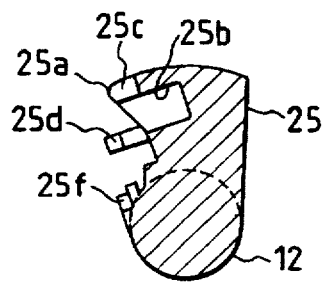
FIG. 11 is a longitudinal sectional view of a stopper protrusion of the fourth embodiment of the invention.
Figure 12:
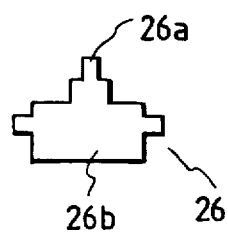
FIG. 12 is a front view of a cam plate of the fourth embodiment of the invention.

In the fourth embodiment, a stopper protrusion 25 is provided on the outer peripheral surface of a shaft 12 as an arm member in place of the stopper protrusion 13 in the first embodiment, and the tip of the stopper protrusion 25 functions as a rotation regulation part 25a (see FIGS. 9(b), 10, and 11) and is formed with a recess 25b for housing a compression coil spring 22 as in the first embodiment and a groove 25c into which a guide part 26a formed in the tip of a cam plate 26 shown in FIG. 12 is fitted.

Figure 9C:
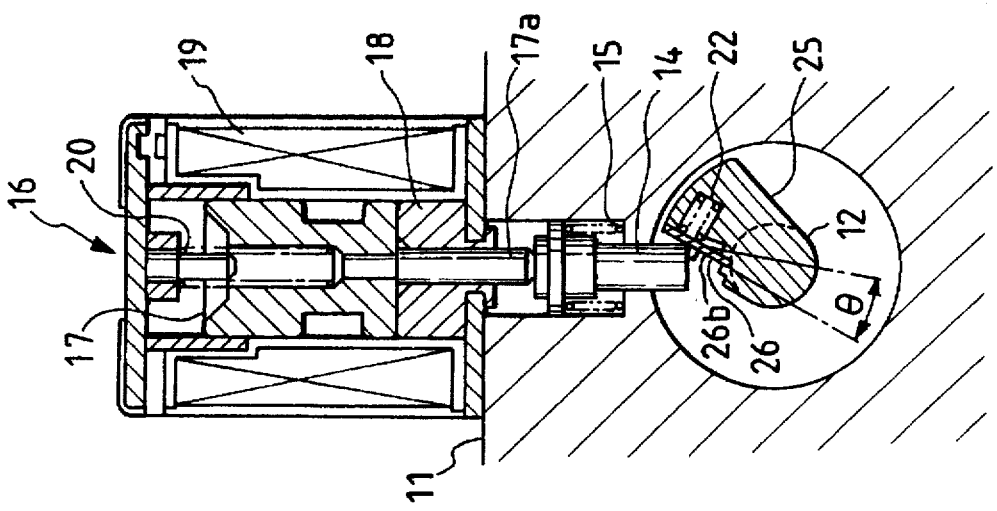

The stopper protrusion 25 holds the cam plate 26 so that it can pivotally travels between the first position shown in FIG. 9(a), (c) and the second position shown in FIG. 9 (b). When the cam plate 26 is at the first position, it is positioned so that its front face (abutment face with a stopper pin 14) becomes tilted shallower by angle θ (see FIG. 9(c)) than the face perpendicular to the rotation direction of the stopper protrusion 25, whereby the front face functions as a cam face 26b called in the invention. To attach the cam plate 26 to the stopper protrusion 25, it is held by holding pieces 25d–25f formed in the stopper protrusion 25 (see FIGS. 10 and 11); in fact, the lower holding piece 25f is formed as shown in the figures by postprocessing of caulking.

Therefore, the fourth embodiment having the structural also produces a similar effect to that of the first embodiment. Particularly, in the fourth embodiment, the cam plate 26 may be of a simple flat form, so that the entire structural can be simplified.

Fifth Embodiment

Figure 13A:
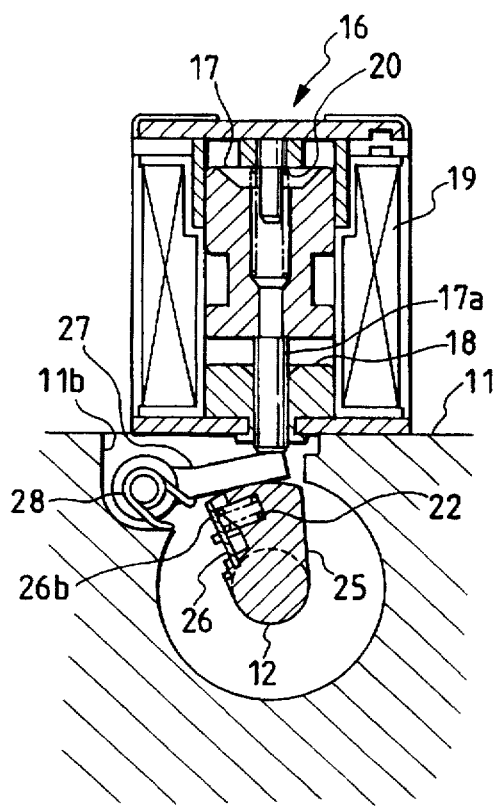
FIGS. 13(a) and (b) are longitudinal sectional views showing a fifth embodiment of the invention.

FIG. 13 shows a fifth embodiment of the invention for producing a similar effect to that of the fourth embodiment. Only the differences between the first and fifth embodiments will be discussed.

The fifth embodiment is characterized by the fact that a swing lever 27 is provided as a stopper member in place of the stopper pin 14 in the fourth embodiment. Specifically, the swing lever 27 is disposed in a through recess 11b of a body 11 so that it can pivotally travel vertically; the swing lever 27 pivotally travels between an operational position protruding in the rotational path of a stopper protrusion 25 (position in FIG. 13(b)) and an operation release position retreating from the rotational path (position in FIG. 13(a)), and a pin 17a of a plunger 17 of an electromagnetic solenoid 16 abuts the top of the swing lever 27. A torsion coil spring 28 for upward energizing the swing lever 27 is disposed on the base of the swing lever 27. The spring force of the torsion coil spring 28 is set to a smaller value than a downward force resulting from totalizing the spring force of a compression coil spring 20 and the weight of the plunger 17, the compression coil spring 20, and the swing lever 27.

Figure 13B:
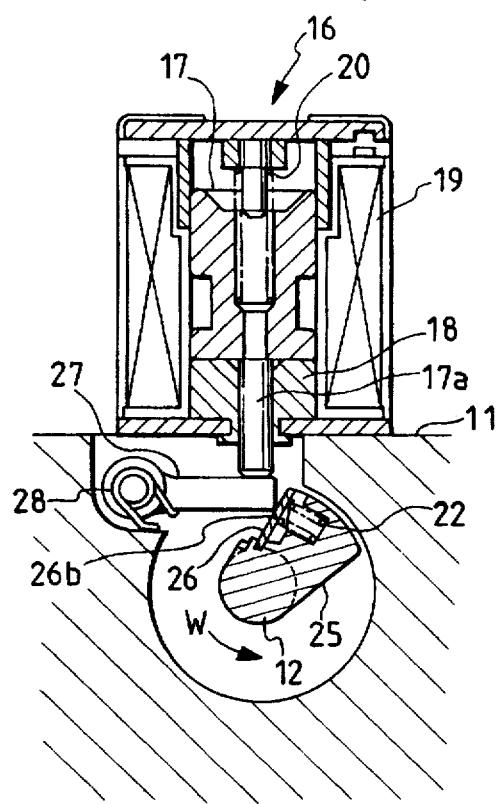

If a shaft 16 is rotated in the arrow W direction in FIG. 13(b) as an ignition key is turned in the lock position direction from the accessory position when the electromagnetic solenoid 16 is powered off, the swing lever 27 is pushed up by a cam face 26b. If turning the ignition key as described above is continued, the swing lever 27 is displaced in the operation release position direction against the weight of the compression coil spring 20 and the plunger 17, etc.

Six Embodiment

Figure 14A:
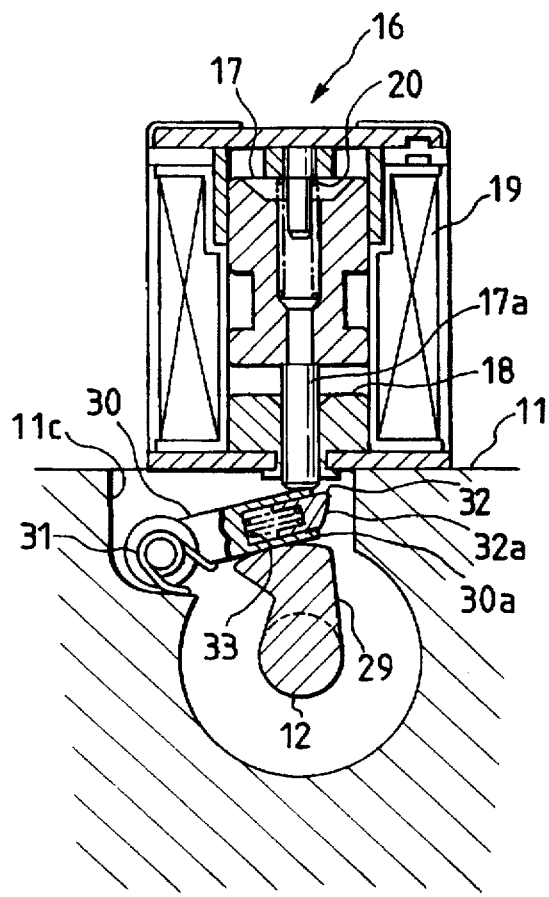
FIGS. 14(a) and (b) are longitudinal sectional views showing a sixth embodiment of the invention.
Figure 14B:
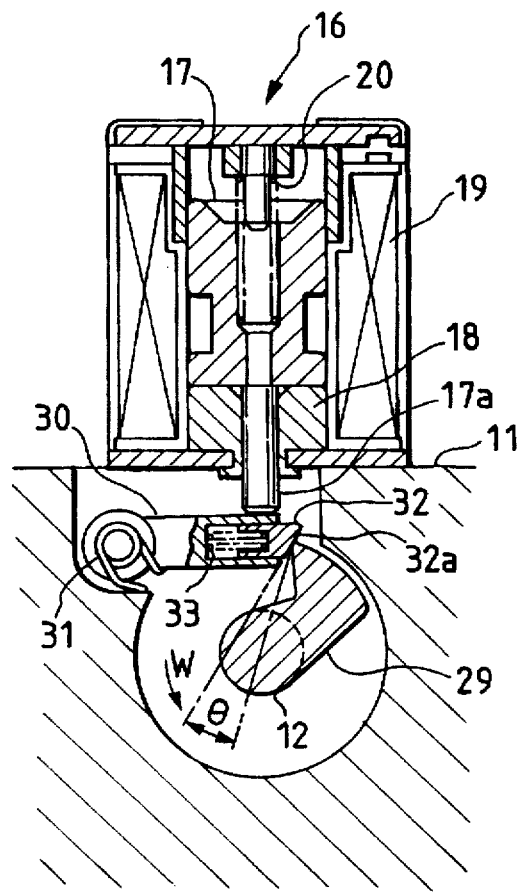
Figure 15A:
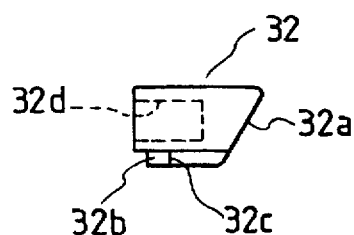
FIGS. 15(a) to (c) are side view, front view, and bottom view of a slider of the sixth embodiment of the invention, respectively.
Figure 15B:
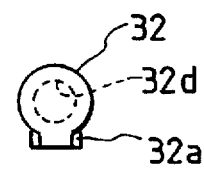
Figure 15C:
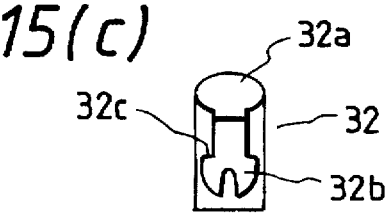
Figure 16A:
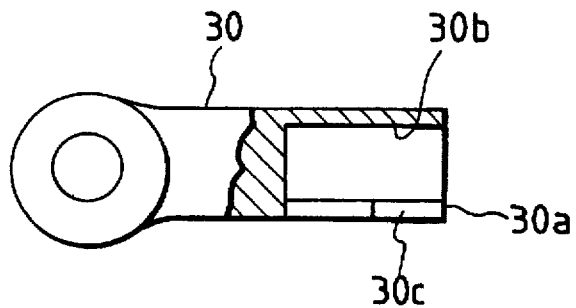
FIGS. 16(a) to (c) are partially broken-away side view, front view, and partial bottom view of a swing lever of the sixth embodiment of the invention, respectively.
Figure 16B:
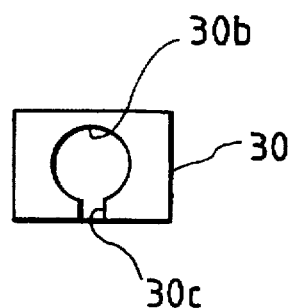
Figure 16C:
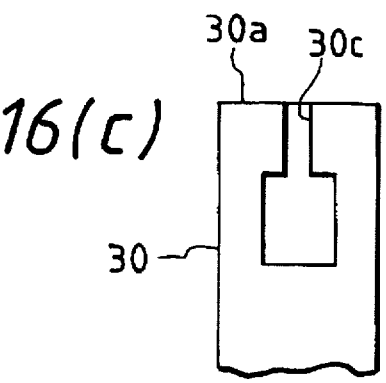

FIGS. 14 to 16 show a sixth embodiment of the invention for producing a similar effect to that of the first embodiment. Only the differences between the first and sixth embodiments will be discussed.

In the sixth embodiment, a stopper protrusion 29 is provided on the outer peripheral surface of a shaft 12 as an arm member in place of the stopper protrusion 13 in the first embodiment, and a bar-like swing lever 30 is provided as a stopper member in place of the stopper pin 14 in the first embodiment.

In this case, the swing lever 30 is disposed in a through recess 11c of a body 11 so that it can pivotally travel vertically; the swing lever 30 pivotally travels between an operational position protruding in the rotational path of a stopper protrusion 29 (position in FIG. 14(b)) and an operation release position retreating from the rotational path (position in FIG. 14(a)), and a pin 17a of a plunger 17 of an electromagnetic solenoid 16 abuts the top of the swing lever 30.

The swing lever 30 is formed so that it has a tip abutting the side of the stopper protrusion 29, and the tip functions as a rotation regulation part 30a. This means that the rotation regulation part 30a abuts the stopper protrusion 29 when the swing lever 30 is at the operational position, thereby regulating rotation of the stopper protrusion 29, which is formed so that it can exert such a rotation regulation function.

A torsion coil spring 31 for upward energizing the swing lever 30 is disposed on the base of the swing lever 30. The spring force of the torsion coil spring 31 is set to a smaller value than a downward force resulting from totalizing the spring force of a compression coil spring 20 and the weight of the plunger 17, the compression coil spring 20, and the swing lever 30. Therefore, the swing lever 30 is energized in the downward operational position (FIG. 14(b)) direction by the spring force of the compression coil spring 20 at the normal time.

The swing lever 30 is formed with a round slider housing hole 30b opened in the tip face of the swing lever 30 and a stepped slit 30c on the bottom, as shown in FIG. 16. A slider 32 (see FIGS. 14 and 15) as a cam member made of a material having a high self-lubricating ability, such as a polyacetal resin, is housed in the slider housing hole 30b so that it can travel in an axial direction of the swing lever 30.

In this case, the slider 32 travels between a first position (FIG. 14(b)) at which the tip face of the slider 32 abuts the tip of the stopper protrusion 29 before the rotation regulation part 30a when the stopper protrusion 29 is rotated in a direction of the slider 32 and a second position (not shown) retreating from the rotation regulation part 30a.

When the slider 32 is at the first position, it is positioned so that the tip face (abutment face with the stopper protrusion 29) becomes tilted shallower by angle θ (see FIG. 14 (b)) than the face perpendicular to the rotation direction of the stopper protrusion 29, whereby the tip face functions as a cam face 32a. As a result, assuming that the slider 32 is held at the first position, if a shaft 12 is rotated in the arrow W direction in FIG. 14(b) as an ignition key is turned in the lock position direction from the accessory position when the electromagnetic solenoid 16 is powered off, the swing lever 30 is pushed up by a cam face 32a. If turning the ignition key as described above is continued, the swing lever 30 is displaced in the operation release position direction against the weight of the compression coil spring 20 and the plunger 17, etc.

A compression coil spring 33, spring means called in the invention, intervening between the slider 32 and the deep wall of the slider housing hole 30b is housed in the slider housing hole 30b of the swing lever 30. The slider 32 is energized in a direction of the first position by the compression coil spring 33 at the normal time.

In this case, the spring force of the compression coil spring 33 is set to a value larger than a force acting on the slider 32 from the stopper protrusion 29 when the shaft 12 is rotated in the arrow W direction in a condition in which the electromagnetic solenoid 16 is powered off (corresponding to a force resulting from subtracting an upward force produced by the torsion coil spring 31 from a downward force responsive to the spring force of the compression coil spring 20 in the electromagnetic solenoid 19 and the weight of the plunger 17, etc.,) and smaller than a force acting on the slider 32 when the shaft 12 is rotated in the arrow W direction in a condition in which the electromagnetic solenoid 16 is energized (corresponding to a force resulting from adding the attraction force of the electromagnetic solenoid 16 to the downward force).

Therefore, when the shaft 12 is rotated in the arrow W direction with the electromagnetic solenoid 16 powered off, the slider 32 remains held in the first position and the swing lever 30 is pushed up by the cam face 32a. When the shaft 12 is rotated in the arrow W direction with the electromagnetic solenoid 16 energized, the compression coil spring 33 is compressed, moving the slider 32 to the second position, thereby making the function of the cam face 32a ineffective.

The swing lever 30 is made of, for example, a plastic that can be elastically deformed. When the slider 32 is housed, the slit 30c is spread by means of a sagittal protrusion 32b (see FIG. 15) provided on the bottom of the slider 32. With the slider 32 housed in the slider housing hole 30b, a step part 32c of the sagittal protrusion 32b abuts the step part of the slit 30c, thereby preventing the slider 32 from being detached. The slider 32 is also formed with a recess 32d for housing the compression coil spring 33.

Seventh Embodiment

Figure 19A:
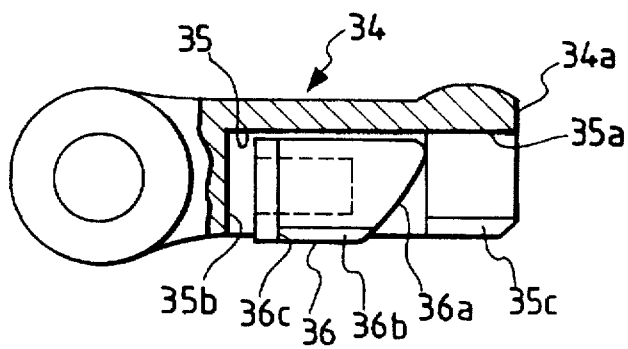
FIGS. 19(a) and (b) are partially broken-away side views showing a state in which the slider is being fitted to the swing lever in the seventh embodiment of the invention.
Figure 18C:
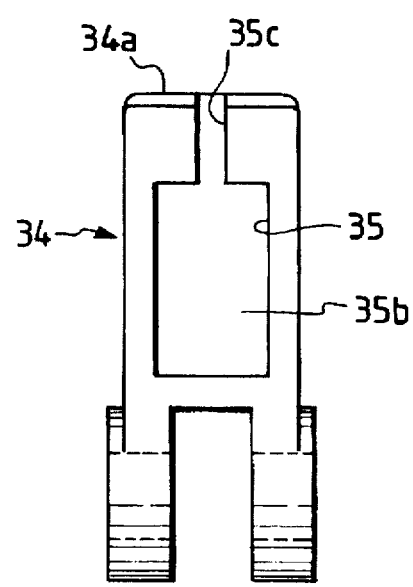
Figure 19B:
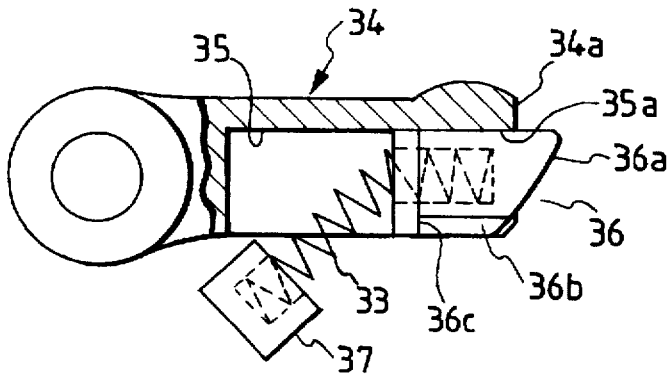

FIGS. 17 to 19 show a seventh embodiment of the invention, an improvement in the sixth embodiment. Only the differences between the sixth and seventh embodiments will be discussed.

As a stopper member in place of the swing lever 30 in the sixth embodiment, the seventh embodiment is provided with a swing lever 34 (see FIGS. 18(a) to (c)) of a similar form to that of the swing lever 30. The swing lever 34 is formed with a square slider housing hole 35 opened in the tip face and side face, which is equivalent to a cam member housing hole called in the invention, and the periphery of a tip face opening 35a of the hole 35 functions as a rotation regulation part 34a called in the invention. The side face opening 35b of the slider housing hole 35 is formed with a narrow slit 35c continuous with the tip face opening 35a. Unlike the swing lever 30 in the sixth embodiment, the swing lever 34 need not be of an elastically deformable structural; it may be made by metal die casting like zinc die casting.

Figure 17A:
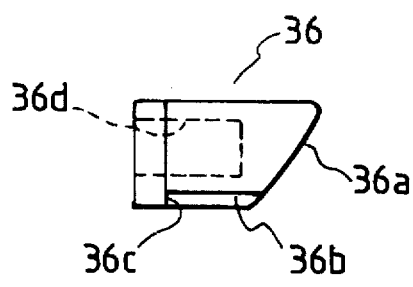
FIGS. 17(a) to (c) are a side view, front view, and bottom view of a slider showing a seventh embodiment of the invention, respectively.
Figure 17B:
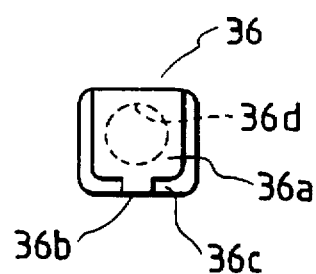
Figure 17C:
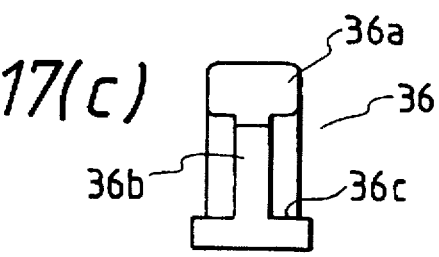

A slider 36 (see FIGS. 17(a) to (c)) housed in the slider housing hole 35 travels between a first position at which the slider 36 abuts the tip of a stopper protrusion 29 (see FIG. 14) before the rotation regulation part 34a when the stopper protrusion 29 is rotated in a direction of the slider 36 and a second position retreating from the rotation regulation part 34a like the slider 32 in the sixth embodiment; the tip face of the slider 36 functions as a cam face 36a.

A projection 36b placed in the slit 35c of the swing lever 34 and a detachment prevention part 36c extended from the projection 36 to the left and right are integrally formed on the bottom of the slider 36. The detachment prevention part 36c abuts the edge of the side face opening 35b, thereby preventing the slider 36 from being detached in a direction of the first position. The slider 36 is also formed with a recess 36d for housing a compression coil spring 33.

To house the slider 36 in the slider housing hole 35 of the swing lever 34, as shown in FIG. 19, the slider 36 is inserted into the slider housing hole 35 through the side face opening 35b and the compression coil spring 33 and a spring receiving spacer member 37, for example, like a square cylinder with a bottom are housed in the slider housing hole 35 to intervene between the slider 36 and the deep wall of the slider housing hole 35, whereby the slider 36 is energized in the first position direction by the compression coil spring 33 at the normal time. In this case, to prevent the spacer member 37 and the compression coil spring 33 from falling out, the spacer member 37 may be caulked against the swing lever 34.

The embodiment having the structural also produces a similar effect to that of the sixth embodiment. Particularly in the seventh embodiment, to build the slider 36 in the swing lever 34, after the slider 36 is inserted into the slider housing hole 35 made in the swing lever 34 through the side face opening 35b, the compression coil spring 33 and the spacer member 37 need only to be housed in the slider housing hole 35, improving assembly workability. Moreover, with the slider 36 inserted in the slider housing hole 35, the slider 36 is energized by the compression coil spring 33 in the first position direction projecting through the tip face opening 35a from the swing lever 34 and is prevented from being detached in the direction by means of the detachment prevention part 36c formed integrally with the slider 36. Thus, once the slider 36 is inserted into the slider housing hole 35, the slider 36, the compression coil spring 33, and the spacer member 37 become hard to fall out. Therefore, the swing lever 34, the slider 36, the compression coil spring 33, and the spacer member 37 can be handled as a part, also improving assembly workability.

Eighth Embodiment

The structural of using the slider 32 as in the sixth embodiment can also be developed as in an eighth embodiment of the invention shown in FIG. 20.

The eighth embodiment is characterized by the fact that a swing lever 38 different in supporting point position is provided in place of the swing lever 30 in the sixth embodiment. The swing lever 38 also pivotally travels between an operational position protruding in the rotation path of a stopper protrusion 29 (position in FIG. 20(b)) and an operation release position retreating from the rotation path (position in FIG. 20(a)), and a pin 17a of an electromagnetic solenoid 16 abuts the top of the swing lever 38. The swing lever 38 is formed so that the lower edge of a slider housing hole made in the center of the swing lever 38 functions as a rotation regulation part 38a abutting the stopper protrusion 29. A torsion coil spring 39 for upward energizing the swing lever 38 is disposed on the base of the swing lever 38. The spring force of the torsion coil spring 39 is set to a smaller value than a downward force resulting from totalizing the spring force of a compression coil spring 20 and the weight of a plunger 17, the compression coil spring 20, and the swing lever 38.

A slider 32 and a compression coil spring 33 like those of the sixth embodiment are disposed in the slider housing hole of the swing lever 38. The slider 32 travels between a first position (FIG. 20(b)) at which a cam face 32a at the tip of the slider 32 abuts the tip of the stopper protrusion 29 before the rotation regulation part 38a when the stopper protrusion 29 is rotated in a direction of the slider 32 and a second position (not shown) retreating from the rotation regulation part 38a.

Thus, when the electromagnetic solenoid 16 is turned off, if a shaft 12 is rotated in the arrow W direction in FIG. 20(b) as an ignition key is turned in the lock position direction from the accessory position, the swing lever 38 is pushed up by the cam face 32a. If turning the ignition key as described above is continued, the swing lever 38 is displaced in the operation release position direction against the weight of the compression coil spring 20 and the plunger 17, etc.

Ninth Embodiment

FIGS. 21 to 25 show a ninth embodiment of the invention. Only the differences between the ninth embodiment and the sixth and seventh embodiments will be discussed.

Figure 21A:
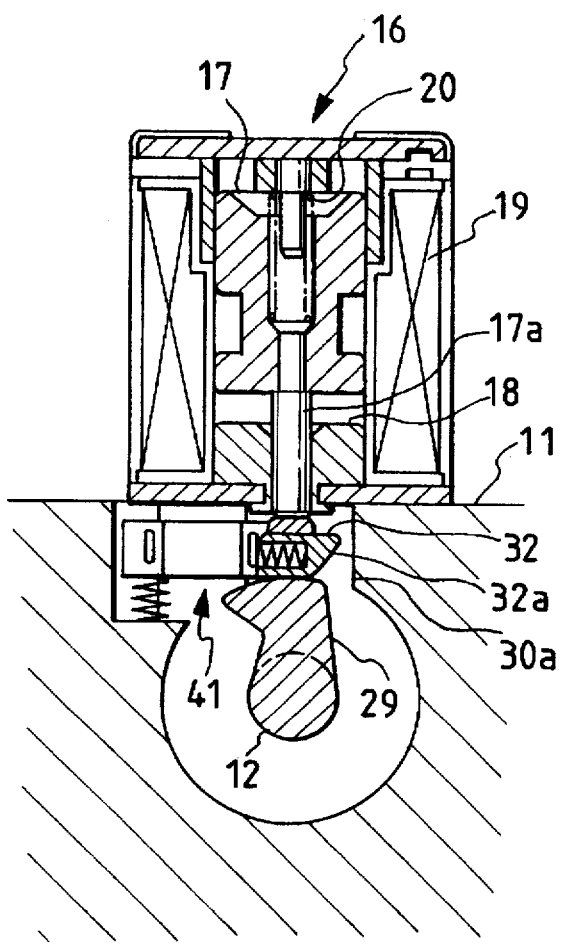
FIGS. 21(a) and (b) are longitudinal sectional views showing a ninth embodiment of the invention.
Figure 21B:
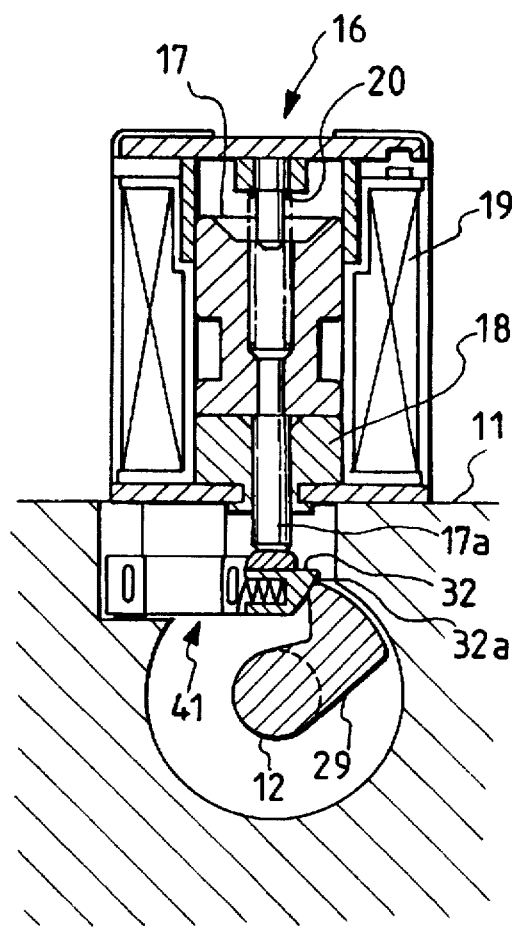

As shown in FIG. 21, a guide recess 40 formed in a body 11 is opened on the top of the body 11 in a condition in which it is oriented to a move direction (vertical direction) of a pin 17a. A stopper unit 41 is housed in the guide recess 40 so that it can reciprocate linearly in the vertical direction.

Figure 22:
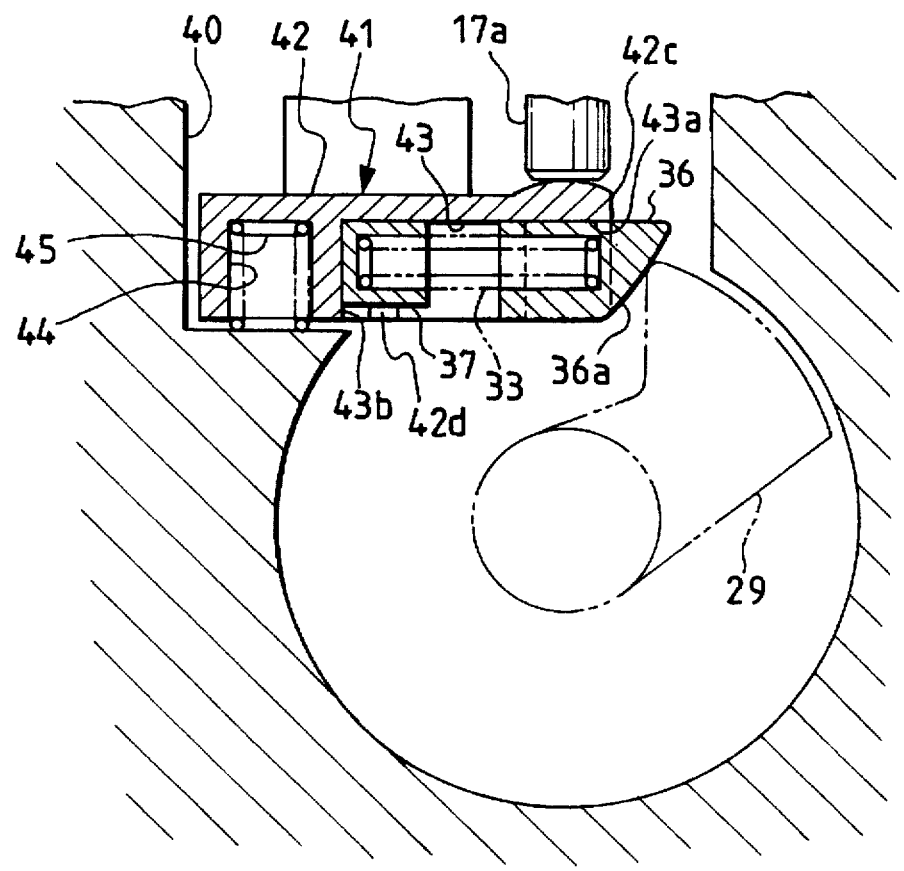
FIG. 22 is a longitudinal sectional view of the main part of the ninth embodiment of the invention.

As shown in FIG. 22, the stopper unit 41 comprises a slider 36, a compression coil spring 33, and a spacer member 37 like those of the seventh embodiment built in a slide case 42 as a stopper member in one piece.

Figure 23:
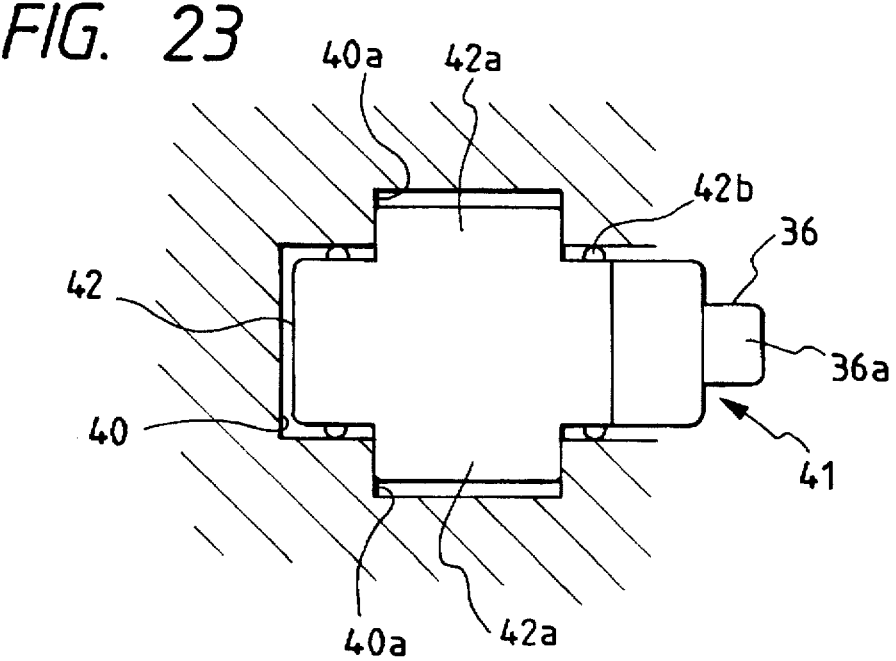
FIG. 23 is a plan view of the main part of the ninth embodiment of the invention.
Figure 24:
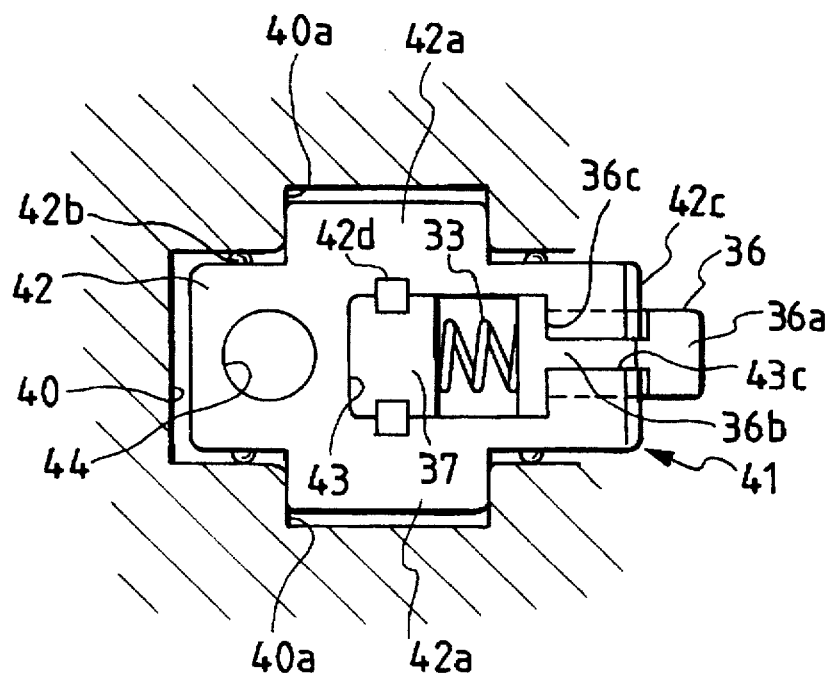
FIG. 24 is a bottom view of the main part of the ninth embodiment of the invention.
Figure 25:
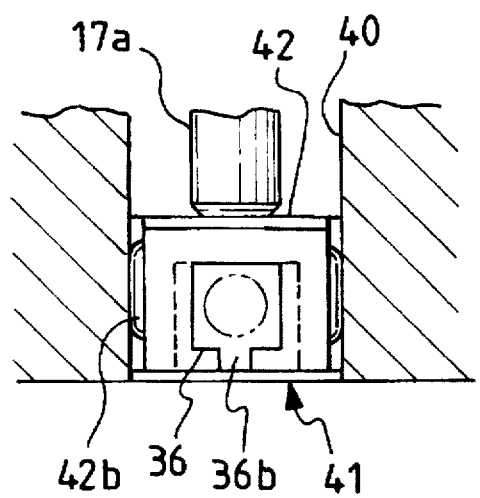
FIG. 25 is a front view of the main part of the ninth embodiment of the invention.

In this case, as shown in FIGS. 23 and 24, a pair of swellings 42a and 42a is formed on the opposed sides of the slide case 42 and guide grooves 40a in which the swellings 42a and 42a are inserted are formed in the guide recess 40 in a condition in which they are oriented vertically. The swellings 42a and the guide grooves 40a regulate the move direction of the slide case 42. A total of four projections 42b (also shown in FIG. 25) oriented vertically are formed on both sides of the swellings 42a in the slide case 42 and abut the side faces of the guide recess 40, thereby preventing the slide case 42 from loosening.

The slide case 42 is formed with a slider housing hole 43 opened in the tip face and side face, which is equivalent to a cam member housing recess, and the periphery of a tip face opening 43a of the slider housing hole 43 functions as a rotation regulation part 42a. The side face opening 43b of the slider housing hole 43 is formed with a narrow slit 43c continuous with the tip face opening 43a. Further, the slide case 42 is formed with a recess 44 opened on its bottom at a position adjacent to the slider housing hole 43 (position opposed to the slider 36).

With the slider 36 housed in the slider housing hole 43, the slider 36 travels between a first position at which the slider 36 abuts the tip of a stopper protrusion 29 before the rotation regulation part 42c when the stopper protrusion 29 is rotated in a direction of the slider 36 and a second position retreating from the rotation regulation part 42c.

When the slider 36, the compression coil spring 33, and the spacer member 37 are housed in the slider housing hole 43 of the slide case 42, the compression coil spring 33 and the spacer member 37 intervene between the slider 36 and the deep wall of the slider housing hole 43. At the time, a projection 36b on the bottom of the slider 36 is placed in the slit 43c of the slide case 42 and a detachment prevention part 36c on the bottom of the slider 36 abuts the edge of the side face opening 43b, thereby preventing the slider 36 from being detached in a direction of the first position. Further, to prevent the spacer member 37 and the compression coil spring 33 from falling out, a part of the slide case 42 is formed as a caulking part 42d for fixing the spacer member 37.

A compression coil spring 45 is housed in the recess 44 of the slide case 42 as auxiliary spring means for energizing the slide case 42 upward (in an operation release position direction). In this case, the spring force of the compression coil spring 45 is set to a smaller value than a downward force resulting from totalizing the spring force of a compression coil spring 20 and the weight of a plunger 17, the compression coil spring 20, and the stopper unit 41. Therefore, the slide case 42 forming a part of the stopper unit 41 is energized in the downward operational position (FIG. 21(b)) direction by the spring force of the compression coil spring 20, etc., at the normal time.

According to the structural, when a shaft 12 is rotated in the arrow W direction with the electromagnetic solenoid 16 powered off, the slider 36 remains held in the first position and the slide case 42 is pushed up linearly by the cam face 36a. When the shaft 12 is rotated in the arrow W direction with the electromagnetic solenoid 16 energized, the compression coil spring 33 is compressed, moving the slider 36 to the second position, thereby making the function of the cam face 36a ineffective. Thus, the rotation regulation part 42c regulates rotation of the stopper protrusion 29a.

Therefore, the ninth embodiment also produces a similar effect to that of the sixth and seventh embodiments. Particularly in the ninth embodiment, the slide case 42 provided with the rotation regulation part 42c is formed as the stopper unit 41 in which the slide case 42, the slider 36, the compression coil spring 33, and the spacer member 37 are integrated, so that they can be handled as a part, improving assembly workability. In the manufacturing process, the stopper unit 41 needs only to be housed in the guide recess 40, so that assembly workability can be furthermore improved.

Tenth Embodiment

Figure 26A:
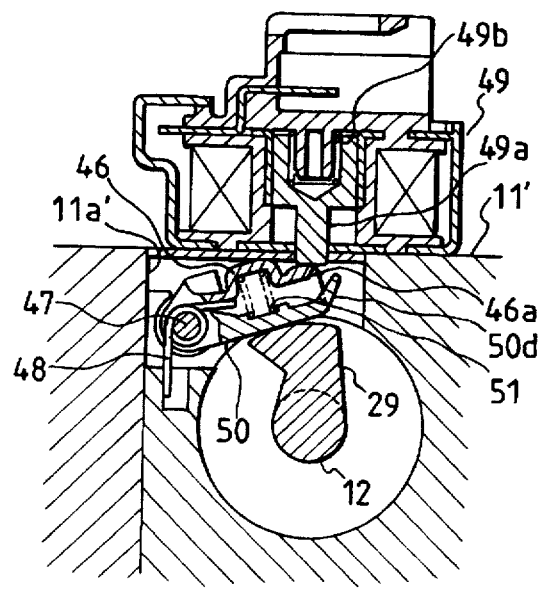
FIGS. 26(a) and (b) are longitudinal sectional views showing a tenth embodiment of the invention.
Figure 26B:
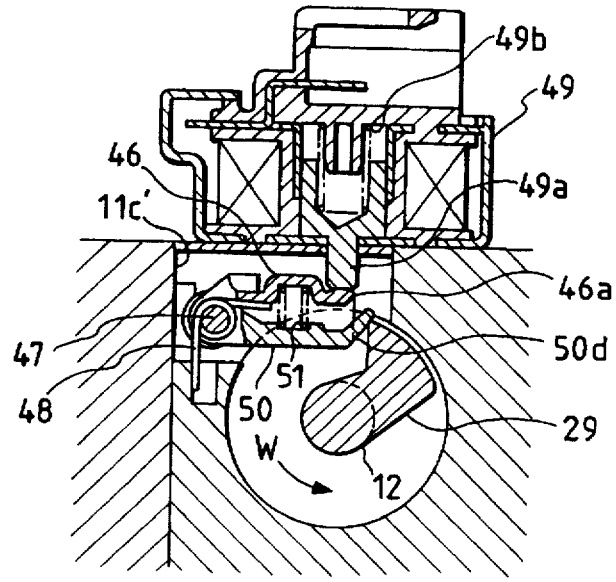
Figure 27:
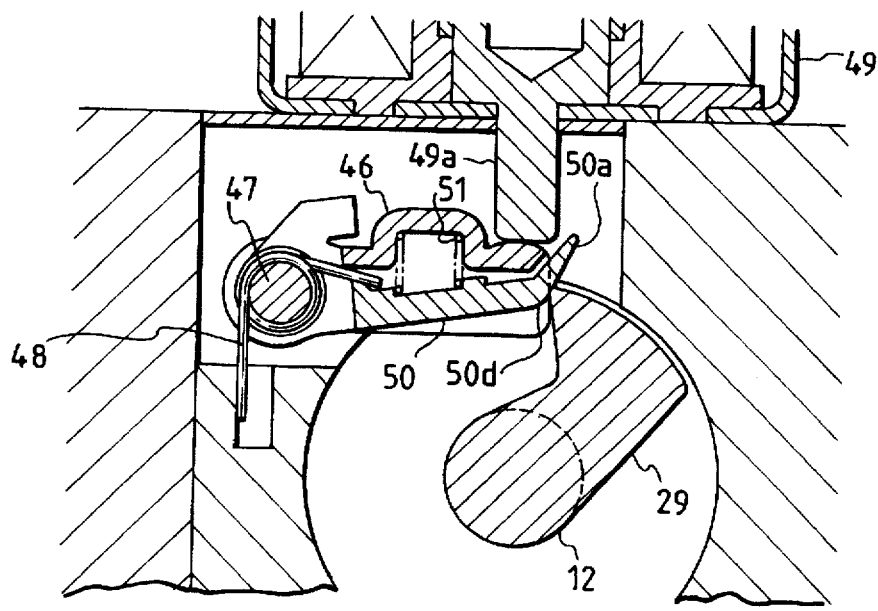
FIG. 27 is a longitudinal sectional view of the main part for explaining the function.

FIGS. 26 and 27 show a tenth embodiment of the invention. Only the differences between the tenth and sixth embodiments will be discussed.

In FIG. 26, a swing lever 46 as a stopper member is provided pivotably in a vertical position with a support shaft 47 as a supporting point in a through recess 11c' of a body 11'. The swing lever 46 travels pivotally between an operational position (FIG. 26(b)) at which the tip of the swing lever 46 is placed in the rotation path of a stopper protrusion 29 and an operation release position (FIG. 26(a)) at which it is retreated from the rotation path.

Figure 28A:
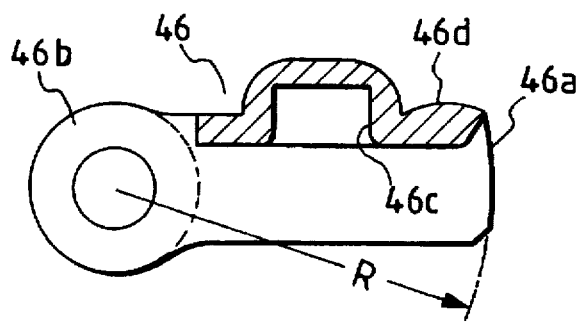
FIGS. 28(a) to (c) are a side view, bottom view, and front view of a swing lever of the tenth embodiment of the invention, respectively.

In this case, as shown in FIG. 28(a), the tip of the swing lever 46 is a rotation regulation face 46a like a circular arc (curvature R) with the support shaft 47 as the center, which is equivalent to a rotation regulation part called in the invention). Thus, when the swing lever 46 is at the operational position, the rotation regulation face 46a abuts the stopper protrusion 29 for regulating rotation of the stopper protrusion 29. Since the rotation regulation face 46a is formed like a circular arc with the support shaft 47 as the center as described above, the force that acts on the rotation regulation face 46a from the stopper protrusion 29 acts on the rotation center of the swing lever 46 at the normal time; it is not feared that an unnecessary moment force acting so as to rotate the swing lever 46 may occur.

A torsion coil spring 48 for upward energizing the swing lever 46 is disposed on the base of the swing lever 46. The spring force of the torsion coil spring 48 is set to a smaller value than a downward force resulting from totalizing a downward force acting from an electromagnetic solenoid 49 and the weight of the swing lever 46. Therefore, the swing lever 46 is energized in the downward operational position (FIG. 26 (b)) direction at the normal time.

An auxiliary swing lever 50 as a cam member is supported pivotably by the support shaft 47 and is formed coaxially with the swing lever 46. The forms of the auxiliary swing lever 50 and the swing lever 46 will be discussed.

Figure 28C:
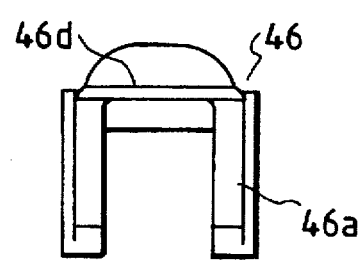
Figure 28B:
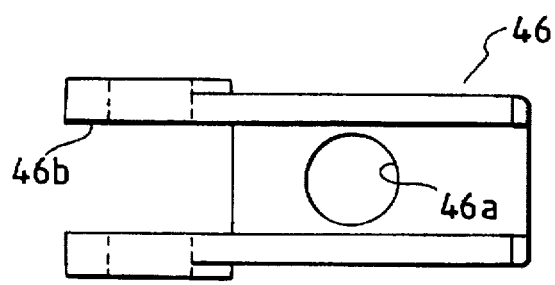

As shown in FIG. 28, the swing lever 46 has a bottom and tip face opened, a base formed with a slit 46b in which the base of the auxiliary swing lever 50 is inserted, and a center formed with a spring receiving recess 46c opened in its bottom. The abutment with plunger 49a of the electromagnetic solenoid 49 on the top of the tip of the swing lever 46 functions as a plunger reception part 46d having a cross section form swelling like a half moon. The electromagnetic solenoid 49 is provided with a compression coil spring 49b for downward energizing the plunger 49a as energizing means called in the invention.

Figure 29A:
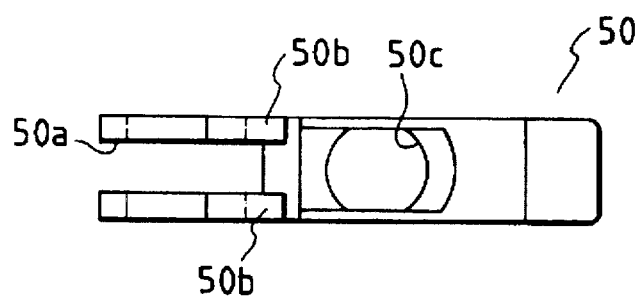
FIGS. 29(a) to (c) are a top view, side view, and front view of an auxiliary swing lever of the tenth embodiment of the invention, respectively.
Figure 29B:
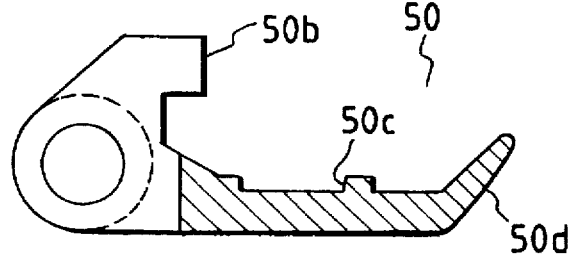
Figure 29C:
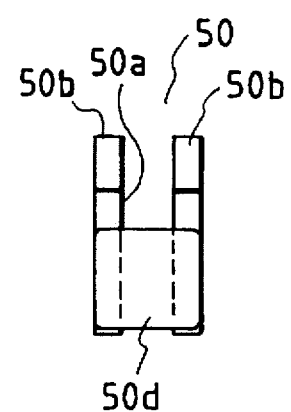

The auxiliary swing lever 50, which is placed below the swing lever 46, has a base formed with a slit 50a for relieving the torsion coil spring 48 and hooks 50b and 50b locked on the top of the swing lever 46, as shown in FIG. 29, for regulating downward rotation. The central top of the auxiliary swing lever 50 is formed with a spring receiving recess 50c at a position corresponding to the spring receiving recess 46c of the swing lever 46.

The auxiliary swing lever 50 has a tip formed with a cam face 50d, which travels between a first position (FIG. 26 (b)) at which the cam face 50d abuts the stopper protrusion 29 before the rotation regulation face 46a of the swing lever 46 when the stopper protrusion 29 is rotated in a direction of the swing lever 46 and a second position (FIG. 27) retreating upward from the rotation regulation face 46a. The cam face 50d is formed like a circular arc such that the pressure angle between the cam face 50d and the stopper protrusion 29 becomes almost constant regardless of the rotation position of the auxiliary swing lever 50.

Referring again to FIGS. 26(a) and (b), a compression coil spring 51, which is equivalent to spring means called in the invention, intervenes between the spring receiving recesses 46c and 50c of the swing lever 46 and the auxiliary swing lever 50. The auxiliary swing lever 50 is energized in a direction of the first position by the compression coil spring 51 at the normal time. In this case, the spring force of the compression coil spring 51 is set to a value larger than a downward force acting on the swing lever 46 with the electromagnetic solenoid 49 powered off and smaller than the downward force to which the attraction force as the electromagnetic solenoid 49 is energized is added.

Therefore, when the electromagnetic solenoid 49 is powered off, even if a rotation force acts on the cam face 50d from the stopper protrusion 29 as a shaft 12 is rotated in the arrow W direction, the auxiliary swing lever 50 remains held in the first position by the spring force of the compression coil spring 51. Thus, the swing lever 46 together with the auxiliary swing lever 50 is pushed up by the cam function of the cam face 50d (see FIG. 26(a)), allowing the shaft 12 to rotate.

In contrast, when the electromagnetic solenoid 49 is energized, if a rotation force acts on the cam face 50d from the stopper protrusion 29 as the shaft 12 is rotated in the arrow W direction, the compression coil spring 51 is compressed and deformed for moving the auxiliary swing lever 50 to the second position as shown in FIG. 27, so that the function of the cam face 50d is made ineffective. Therefore, the stopper protrusion 29 abuts the rotation regulation face 46a of the swing lever 46, regulating rotation of the shaft 12.

The tenth embodiment having the structural also produces a similar effect to that of the sixth embodiment. Particularly in the tenth embodiment, since the cam face 50d is formed in the auxiliary swing lever 50 rotating with the support shaft 47 as the supporting point, a force received from the stopper protrusion 29 in response to rotation of the shaft 12 in the arrow W direction can be efficiently converted into a rotation force of the auxiliary swing lever 50, improving operability. According to the structural, even if the friction coefficient between the stopper protrusion 29 and the cam face 50d changes, a load acting on the compression coil spring 51 with the electromagnetic solenoid 49 energized is made constant, thus the holding power required for the electromagnetic solenoid 51 may be set to a necessary minimum value, enabling miniaturization thereof.

Moreover, since the force acting on the auxiliary swing lever 50 from the stopper protrusion 29 is transmitted via the compression coil spring 51 to the swing lever 46 at the normal time, it is difficult for the stopper protrusion 29 to abut the rotation regulation face 46a of the 20 swing lever 46 when the shaft 12 is rapidly rotated in the arrow W direction with the electromagnetic solenoid 49 powered off, so that an event in which rotation of the shaft 12 is inadvertently inhibited can be prevented from occurring.

In the embodiments, the electromagnetic solenoid 16 or 49 is placed in a condition in which its attraction force acts from top to bottom, but may be placed in a condition in which the attraction force acts in the opposite direction or from left to right. Although the embodiments use the compression coil spring 20 or 49b as the energizing means, the energizing means is not limited to them. For example, the tare weight of the plunger 17, 49a of the electromagnetic solenoid 16, 49 can also be used as the energizing means. Further, we have discussed application of the invention to the automobile key interlock mechanism in the embodiments, but the invention can be widely applied to general vehicle locking devices using electromagnetic solenoids.

As seen in the description, according to the present invention, to selectively inhibit rotation of a rotor member rotated by an operation member to a specific position in response to energizing of an electromagnetic solenoid, one of an arm member formed integrally with the rotor member and a stopper member that can appear and disappear in a rotational path of the arm member is formed with a rotation regulation part for regulating rotation of the arm member and a cam plate causing the stopper member from retreating from the rotational path of the arm member in response to rotation of the rotor member in the direction of the specific position. In addition, spring means is provided for making the function of the rotation regulation part ineffective and the function of the cam plate effective when the rotor member is rotated in the direction of the specific position with the electromagnetic solenoid powered off and for making the function of the cam plate ineffective and the function of the rotation regulation part effective when the rotor member is rotated in the direction of the specific position with the electromagnetic solenoid energized. Further, the energizing direction by the energizing means disposed in the stopper means is made the same as the force acting direction by the electromagnetic solenoid. Thus, the electromagnetic solenoid may generate a comparatively small force and can be miniaturized without increasing heat output or costs. Noise caused by energizing and powering off the electromagnetic solenoid can be suppressed and the lock function can be secured at the same time.

In the present invention, the cam member and the spring means are built in the stopper member formed with the rotation regulation part to make up a stopper unit. Thus, they can be handled as one part and assembly workability can be improved. The arm member housing body is formed with a guide recess for housing the stopper unit in a condition in which it can linearly reciprocate. In the manufacturing process, the stopper unit needs only to be housed in the guide recess, so that assembly workability can be furthermore improved.

According to the present invention, to attach the cam member to the stopper member, the cam member needs only to be inserted into the cam member housing hole made in the stopper member through the side face opening of the stopper member, improving assembly workability.

According to the present invention, the vehicle prevention part is formed with a detachment prevention part formed integrally with the cam member for preventing the cam member from being detached by abutting the side face opening edge of the cam member housing hole made in the stopper member. Therefore, the stopper member, the cam member, and the spring means can be handled as one part, also improving assembly workability.

According to the present invention, since the cam member provided with the cam face is of rotation form, the force received from the arm member can be efficiently converted into a rotation force of the cam member, improving operability. Even if the friction coefficient between the arm member and the cam face changes, a load acting on the spring means with the electromagnetic solenoid energized is made constant and the holding power required for the electromagnetic solenoid may be set to a necessary minimum value, thus miniaturization thereof is enabled.

According to the present invention, since the force acting on the cam member from the arm member is transmitted via the compression coil spring to the stopper member at the normal time, it is difficult for the arm member to abut the stopper member when the rotor member is rapidly rotated in the direction of the specific position with the electromagnetic solenoid powered off, an event in which rotation of the rotary member is inadvertently inhibited can be prevented from occurring.

What is claimed is:

1. A vehicle locking device comprising:
   a rotor member rotatable between a first rotor position and at least a second rotor position;
   an arm member formed integrally with said rotor member;
   a stopper member positioned for reciprocation between an operational position within a rotation path of said arm member when said rotor member is at the first rotor position and an operation release position outside of the rotation path when said rotor member is at the second rotor position;
   energizing means for energizing said stopper member in a direction of the operational position;
   an electromagnetic solenoid for holding said stopper member at the operational position when said electromagnetic solenoid is energized;
   a rotation regulation portion attached to at least one of said arm member and said stopper member, said rotation regulation portion and the at least one of said stopper member and said arm member forming a rotation regulation member to regulate motion of said arm member by abutting at least one of said arm member and said stopper member when said stopper member is in the operational position;
   a cam member attached to said rotation regulation position for movement between a first cam position at which said cam member abuts one of said arm member and said stopper member at the first rotor position and the second rotor position, said cam member including a cam face for displacing said stopper member in a direction of the operation release position when said rotor member is rotated from the second rotor position to the first rotor position; and
   spring means for energizing said cam member in a direction of the first cam position, said spring means being adapted to hold said cam member at the first cam position against an energizing force of said energizing means when said rotor member is rotated from the first rotor position to another rotor position with said electromagnetic solenoid powered off and to be deformed so as to move said cam member to the second cam position when said rotor member is rotated from the outer rotor positions to the first rotor position with said electromagnetic solenoid energized.

2. The vehicle locking device as claimed in claim 1, wherein said stopper member includes a stopper unit having said rotation regulation portion and said cam member and said spring means as one piece, and a body for housing said arm member is provided with a guide recess for allowing said stopper member to reciprocate between the operational position and the operation release position by housing said stopper unit in a condition in which said stopper unit can linearly reciprocate.

3. The vehicle locking device as claimed in claim 1 wherein said stopper member has a tip face comprising said rotating regulation portion and containing a cam member housing hole opened in the tip face and a side face of the stopper member,
   wherein said cam member is inserted into the cam member housing hole for energizing said cam member in a direction of the first cam position.

4. The vehicle locking device as claimed in claim 2 wherein said stopper member includes a tip face serving as said rotation regulation portion, and said stopper member contains a cam member housing hole opened in the tip face and a side face thereof,
   wherein said cam member is inserted into the cam member housing hole of said stopper member through the side face opening, so that said cam member travels between a first cam member, position protruding from said rotation regulation portion through the tip face opening of said stopper member and a second cam member position retreating from said rotation regulation portion, and
   wherein said spring means is housed in said cam member housing hole for energizing said cam member in a direction of the first cam member position.

5. The vehicle locking device as claimed in claim 1, wherein said cam member includes a detachment prevention portion being formed integrally therewith, and said detachment prevention portion abuts a side face opening edge of a cam member housing hole to prevent said cam member from being detached in the direction of the first position.

6. A vehicle locking device comprising:

a rotor member rotatable between a first rotor position and at least a second rotor position;

an arm member formed integrally with said rotor member;

a stopper member pivotably positioned with a support shaft as a supporting point, for pivotal movement between an operational position at which a tip of said stopper member is placed in a rotation path of said arm member and an operation release position at which said stopper member is outside the rotation path;

energizing means for energizing said stopper member in a direction of the operational position;

an electromagnetic solenoid for holding said stopper member at the operational position when said electromagnetic solenoid is energized;

a rotation regulation portion formed at the tip of said stopper member, said rotation regulation portion abutting said arm member when said stopper member is at the operational position to regulate a rotation of said arm member;

a cam member pivotably positioned with the support shaft as a supporting point, for pivotal movement between a first cam member position at which the cam member abuts said arm member when said arm member is rotated in a direction of said stopper member and a second cam member position withdrawn from said rotation regulation portion, said cam member having a cam face abutting and displacing said stopper member in a direction of the operation release position when said rotor member is rotated in a direction of the first rotor position with said cam member remaining held at the first cam member position;

spring means for energizing said cam member in a direction of the first cam member position, said spring means being adapted to hold said cam member at the first cam member position against an energizing force of said energizing means when said rotor member is rotated in the direction of the specific position with said electromagnetic solenoid powered off and for deforming said cam member to move said cam member to the second cam member position when said rotor member is rotated in the direction of the second rotor position with said electromagnetic solenoid energized.

7. The vehicle locking device as claimed in claim 6 wherein said spring means includes a compression coil spring placed between said stopper member and said cam member.

* * * * *